United States Patent
Plain et al.

(10) Patent No.: US 9,741,257 B1
(45) Date of Patent: Aug. 22, 2017

(54) SYSTEM AND METHOD FOR COORDINATED LEARNING AND TEACHING USING A VIDEOCONFERENCE SYSTEM

(71) Applicant: Avaya Inc., Santa Clara, CA (US)

(72) Inventors: Kevin Richard Plain, Dacono, CO (US); Chase Schamberger, Denver, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/085,420

(22) Filed: Mar. 30, 2016

(51) Int. Cl.
| H04N 7/15 | (2006.01) |
| G09B 5/02 | (2006.01) |
| G06F 3/14 | (2006.01) |
| H04N 21/4788 | (2011.01) |

(52) U.S. Cl.
CPC ............ *G09B 5/02* (2013.01); *G06F 3/1462* (2013.01); *H04N 7/15* (2013.01); *H04N 21/4788* (2013.01)

(58) Field of Classification Search
CPC ............ H04N 7/14; H04N 7/147; H04N 7/15; H04N 7/152

USPC .................. 348/14.01–14.16; 715/753, 754; 434/408

See application file for complete search history.

(56) References Cited

U.S. PATENT DOCUMENTS

| 8,395,650 | B2 | 3/2013 | Graham et al. | |
| 2009/0247136 | A1* | 10/2009 | Srinivasan | H04M 3/51 455/414.2 |
| 2011/0283008 | A1 | 11/2011 | Smelyansky | |
| 2012/0278738 | A1* | 11/2012 | Kruse | G06Q 10/10 715/754 |
| 2014/0358992 | A1* | 12/2014 | Lo | H04L 67/36 709/203 |
| 2016/0085381 | A1* | 3/2016 | Parker | G06F 9/44 715/753 |

* cited by examiner

*Primary Examiner* — Melur Ramakrishnaiah
(74) *Attorney, Agent, or Firm* — Sheridan Ross P.C.

(57) ABSTRACT

A system and method for collaborative online desktop sharing is described, wherein a teacher can view the teacher's own desktop as well as the desktop(s) of the teacher's student(s), and the student(s) can see their own desktop as well as the teacher's desktop. As a result, the teacher and student(s) can monitor each other's screens, thus allowing the students to follow a teacher's on-screen actions in real time or near real time and allowing the teacher to ensure that student's are successfully completing demonstrated tasks.

20 Claims, 17 Drawing Sheets

SYSTEM AND METHOD FOR COORDINATED LEARNING AND TEACHING USING A VIDEOCONFERENCE SYSTEM

FIELD

The present disclosure is generally related to collaborative online desktop sharing.

BACKGROUND

Prior to the last several decades, teachers instructed students at one physical location, such as a classroom. The teacher was able to interact in person with the students, and was further able to check whether or not a student was following along with the lesson simply by watching the student and, if necessary, walking to the student's desk or other workstation. As conferencing and collaboration tools have evolved, so have teaching methods. Teaching can now be done online, allowing a teacher to instruct students who are physically located in diverse places using the Internet. Further, an online teacher can show students what he is doing on a screen in real time. With the advent of videoconferencing, the teacher is able display his computer screen with students so that students can follow what he is doing.

BRIEF DESCRIPTION OF THE DRAWINGS

In the drawings, like reference characters generally refer to like figures and structural elements throughout the various figures. The following drawings are illustrative of embodiments of the disclosure and are not meant to limit the scope of claims.

DETAILED DESCRIPTION

Figure 1A:
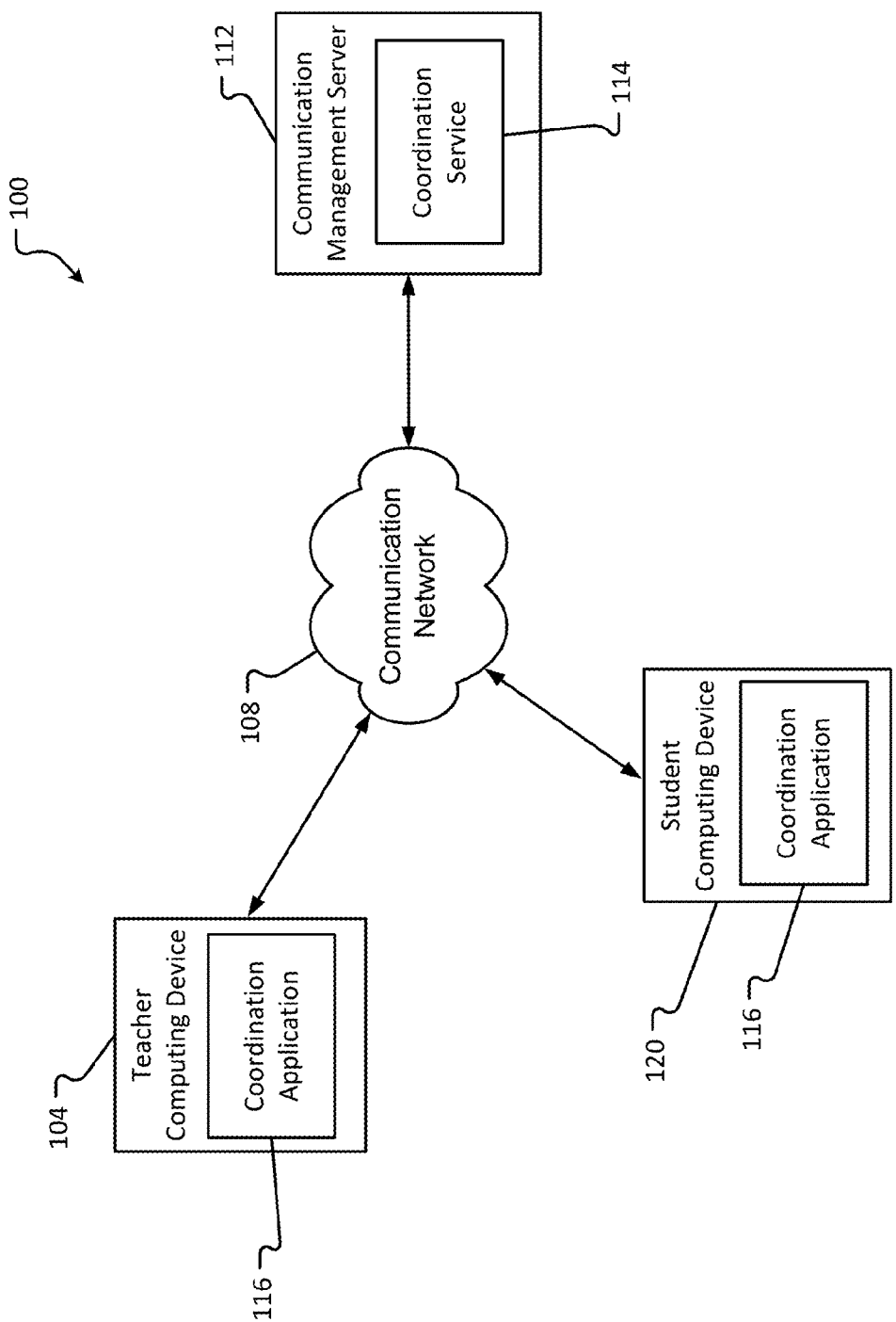
FIG. 1A is a block diagram of a server-supported system according to an embodiment of the present disclosure.

In complex teaching scenarios where students need to do and see and the teacher needs to do and monitor and correct, traditional models of online collaboration can be found lacking. The present disclosure solves these and other issues by providing coordinated shared collaboration tools that allow a program to be launched, shared, and displayed so that a teacher and a student can both see the graphical elements displayed on the screen of the other's computing devices (or portions of those graphical elements) simultaneously. These tools allow for sharing of desktop applications in such a way that both presenter and participant(s), who are physically located in separate places—can see the display on the screen of each other's computing devices (whether the entire display or a portion thereof, e.g. an active window or a particular application that is running on the computer device), and can receive indications of mouse clicks and/or other user inputs, such that a teacher can teach a student how to perform a task using the teacher's computing device and then, on the same device, watch the student perform the task. For example, the teacher can perform an operation on the software application running on the teacher's computing device (e.g. clicking on a given menu in the application), and can then watch the student desktop screen (or application screen), which is also displayed on the teacher's computing device, to ensure that the student properly duplicates the operation. When multiple students are participating, the teacher can watch the desktop screens of each student on the teacher's computing device to ensure that each student properly duplicates the operation in question. Students can be monitored to ensure that they are keeping up and are seeing the same results as the teacher, and errors made by a student can be rapidly identified and corrected.

The present disclosure describes systems and methods for one-to-one instruction (e.g. one teacher or presenter and one student or participant), one-to-many instruction (e.g. one teacher or presenter and a plurality of students or participants), and dual-presenters instruction (e.g. two teachers or presenters giving a presentation to one or more students or participants). In the one-to-one and one-to-many cases, the teacher/presenter can see the students'/participants' computer screens or portions thereof, and the students/participants can see the teacher's/presenter's computer screen or portions thereof. In the dual-presenters case, the students or participants can each see the computer screen (or portions thereof) of each presenter, and each presenter can see the computer screen (or a portion thereof) of the other presenter. In some embodiments, each student/participant can see the screens of fellow students/participants in addition to the teacher's/presenter's screen.

The terms "teacher" or "presenter" are used interchangeably herein and refer to a person who is primarily responsible for providing information during a collaborative session with one or more other individuals. The terms "student" or "participant" are also used interchangeably herein and refer to a person who is primarily responsible for receiving information from a teacher during a collaborative session with the teacher. These terms are not intended to be limiting, however, as embodiments of the present disclosure may be used by teams, collaborators or other groups or individuals who are not primarily responsible for giving and/or receiving information from each other.

The term "one-to-one" as used herein refers to a collaborative session involving one teacher and one student (or, stated differently, to a collaborative session involving two computing devices). The term "one-to-many" as used herein refers to a collaborative session involving one teacher and a plurality of students (or, stated differently, to a collaborative session involving more than two computing devices).

A computing device may be any device that includes a processor, a memory or other computer readable storage medium storing instructions for execution by the processor, and a user interface.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Referring now to FIG. 1A, in a basic server-facilitated one-to-one collaborative system 100 according to an embodiment of the present disclosure, a teacher utilizing a teacher computing device 104 may establish a one-to-one collaborative session over a communication network 108 with a student using a student computing device 120, where the one-to-one collaborative session is facilitated by a communication management server 112 running a coordination service 114. The teacher computing device 104 and the student computing device 120 may each be running a coordination application 116. In some embodiments, the coordination application 116 may be hosted in the cloud and provided through a Software-as-a-Service (SaaS) platform. The communication management server 112 (processing instructions from the coordination service 114) can receive a request from the teacher computing device 104 or from the student computing device 120 to establish a collaboration session, and can then establish a communication channel with both the teacher computing device 104 and the student computing device 120 over the communication network 108. Alternatively, the communication management server 112 can open a communication channel at a predetermined time, and utilize a log-in process whereby any computing device (e.g. a teacher computing device 104 or a student computing device 120) may join the collaborative session upon receipt by the communication management server 112 of proper credentials from the computing device in question. The communication network 108 may be any known communication network suitable for communications between or among computing devices, including a local area network, a wide area network, the Internet, a mesh network, and so forth. The communication channel between the communication management server 112 on the one hand and each of the teacher computing device 104 and the student computing device 120 on the other may be secured using any known authentication and or authorization systems or methods. The operation of a system 100 is described in more detail with respect to FIG. 10A below.

A variety of protocols may be used to set up collaborative sessions according to embodiments of the present disclosure, including hypertext transfer protocol (HTTP), session initiation protocol (SIP), WebRTC (Web Real-Time Communication), dedicated video feeds, and the like. In embodiments using SIP, for example, media identification and negotiation may be achieved using the session description protocol (SDP). Transmission of media streams such as voice and video may be accomplished using Real-time Transport Protocol (RTP) or Secure Real-time Transport Protocol (SRTP). Where security is important, the protocol may be encrypted with Transport Layer Security (TLS). Each transaction of an SIP-enabled collaborative session consists of a client request (e.g. by the computing device 104 or 120) that invokes a particular method or function on the communication management server 112, and at least one response. Thus, to initiate a SIP-enabled collaborative session, a teacher computing device 104 may send an INVITE message to the communication management server together with one or more uniform resource identifiers (URI) indicating where the message should be sent, e.g. to student computing device 120. The communication management server 112 may forward the INVITE message to the student computing device 120, and respond to the INVITE message with a provisional response to the teacher computing device 104 indicating that it has received and is processing the message. Once the student computing device 120 receives the INVITE message, it may send a success message to the communication management server 112, which may in turn send a success message to the teacher computing device 104. The communication management server 112 may then send an ACK message to the student computing device 120 to confirm reliable message exchanges, and the teacher computing device 104 may also send an ACK message to the communication management server 112 for the same purpose. Once reliable communications have been established between the teacher computing device 104 and the communication management server 112 and between the communication management server 112 and the student computing device 120, media can be exchanged between the teacher computing device 104 and the student computing device 120 via the server using RTP or SRTP. The collaborative session ends when the teacher computing device 104 or the student computing device 120 sends a BYE message to the communication management server 112, which forwards the BYE message to the student computing device 120 or the teacher computing device 104, respectively. The communication management server 112 sends a success response to the computing device that initiated the BYE message, and the other computing device sends a success response to the communication management server 112.

The above-described process of establishing and terminating a collaborative session using the SIP protocol is exemplary only. Other protocols may be used to establish collaborative sessions according to embodiments of the present disclosure, and other processes may be followed to establish and terminate collaborative sessions, whether using SIP or another protocol. A computing device 104 or 120 that initiates a collaborative session may specify the parameters of the session, including who may participate, whether there is a cap on the number of participants, who will be the presenter, and so forth. The specified parameters may then be provided to each computing device 104, 120 that joins the collaborative session, and used to establish the collaborative session. For example, a teacher using a teacher computing device 104 may choose to initiate a collaborative session with screen-sharing and an audio communication channel, and these parameters may be provided to the one or more student computing devices 120 that join the collaborative session so that necessary media streams are established. In some embodiments, certain session parameters are determined by each presenter/participant. Such parameters may include, for example, whether the screen of a given computing device will be visible to one or more other participants or presenters in the collaborative session. In other embodiments, however, control of such parameters may be provided to the teacher/presenter, e.g. to allow the teacher/presenter to enforce educational policies.

Media and other data transferred between or among a teacher computing device 104, a communication management server 112, and a student computing device 120 may utilize any available communication path. For example, in a local area network, data transfer among the participating devices may occur via Ethernet cables, or wirelessly via wireless modems and a wireless router. Alternatively, communications may occur over a wide area network such as the Internet, in which case the particular communication path between participating devices may be determined via TCP/IP or other networking protocols.

Applications for establishing, maintaining, and terminating collaborative sessions as described herein may be stand-alone applications stored in a computer readable storage medium of a computing device 104 or 120 and/or a communication management server 112 (e.g. coordination service 114, coordination application 116). In other embodiments, however, such applications may be embedded in or operate as part of other applications, including browsers, operating systems, productivity applications, document processing applications, or the like.

The foregoing discussion of protocols, communication paths, applications is not specific to the embodiment of FIG. 1A, but rather is relevant to various embodiments of the present disclosure, whether in whole or in part, including the embodiments of FIGS. 1B, 2A, and 2B that will now be described.

Figure 1B:
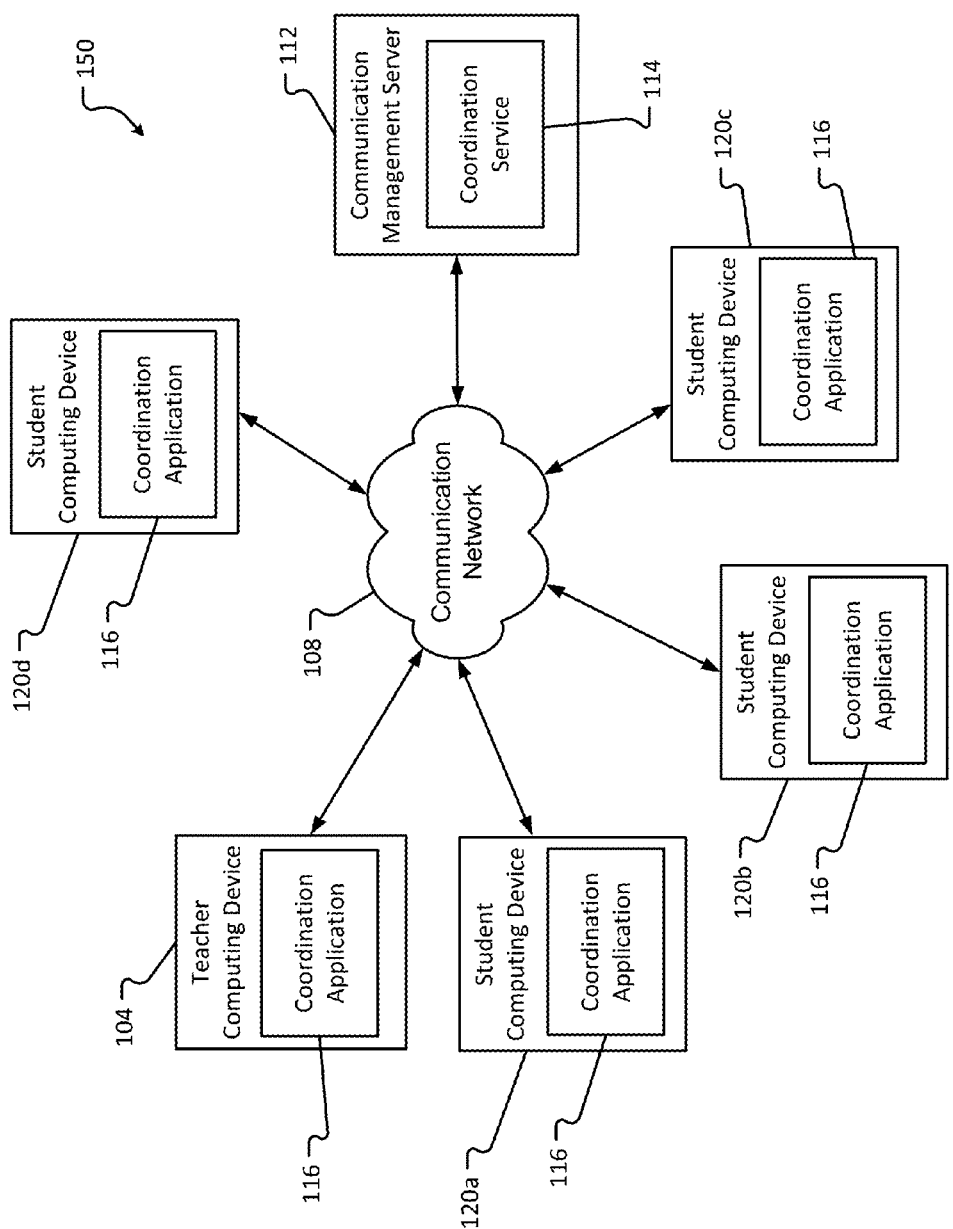
FIG. 1B is a block diagram of a server-supported system according to another embodiment of the present disclosure.

FIG. 1B illustrates a basic server-facilitated one-to-many collaborative system 150 according to another embodiment of the present disclosure. In system 150, a teacher utilizing a teacher computing device 104 may establish a one-to-many collaborative session over a communication network 108 with a plurality of students using student computing devices 120a, b, c, d, . . . n, where the one-to-many collaborative session is facilitated by the communication management server 112 running the coordination service 114. Each of the computing devices in the collaborative session may be running the coordination application 116. The operation of a system 150 is described in more detail with respect to FIG. 10B below.

Figure 2A:
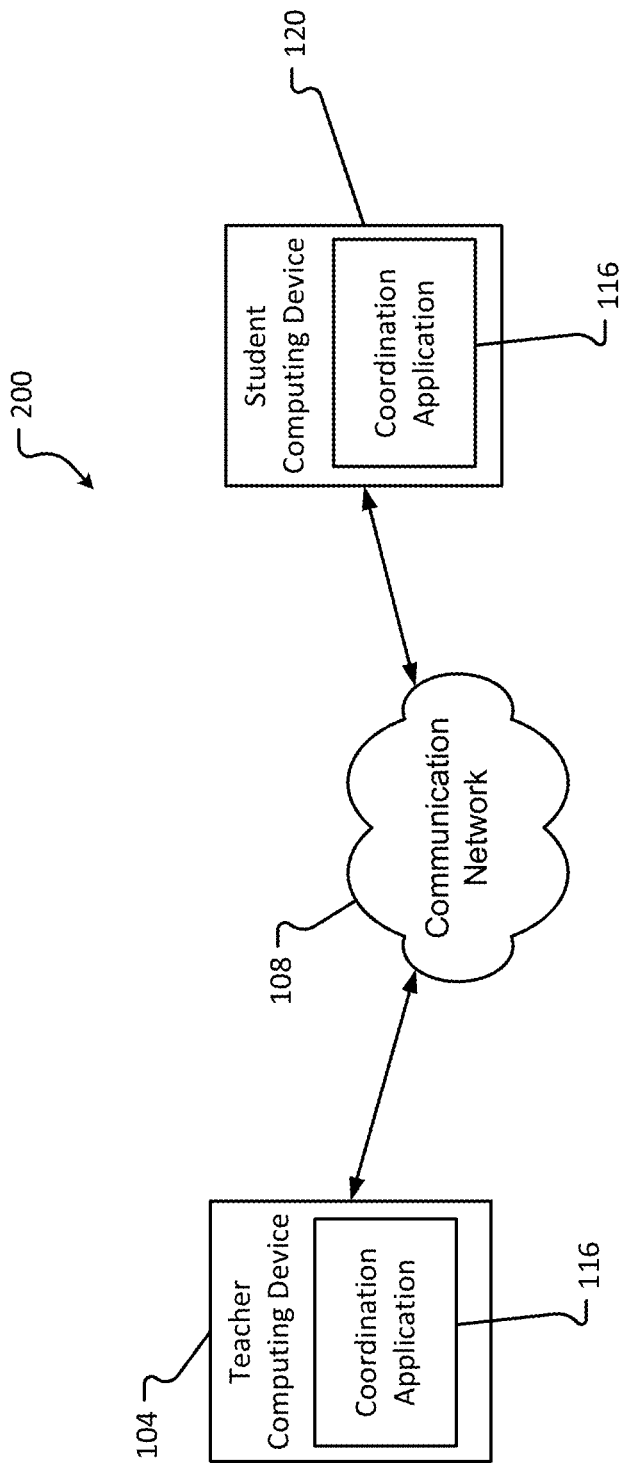
FIG. 2A is a block diagram of a server-less system according to an embodiment of the present disclosure.

Referring now to FIG. 2A, in a basic server-less one-to-one collaborative system 200 according to another embodiment of the present disclosure, a teacher utilizing a teacher computing device 104 may establish a one-to-one collaborative session directly with a student using a student computing device 120 over a communication network 108, without the use of a communication management server such as the communication manager server 112. One or both of teacher computing device 104 and student computing device 120 may have stored in computer readable storage medium a coordination application 116, which may comprise instructions for execution by a processor that allow the computing device upon which the coordination application 116 is executed to establish a communication channel with one or more other computing devices. The operation of a system 200 is described in more detail with respect to FIG. 9A below.

Figure 2B:
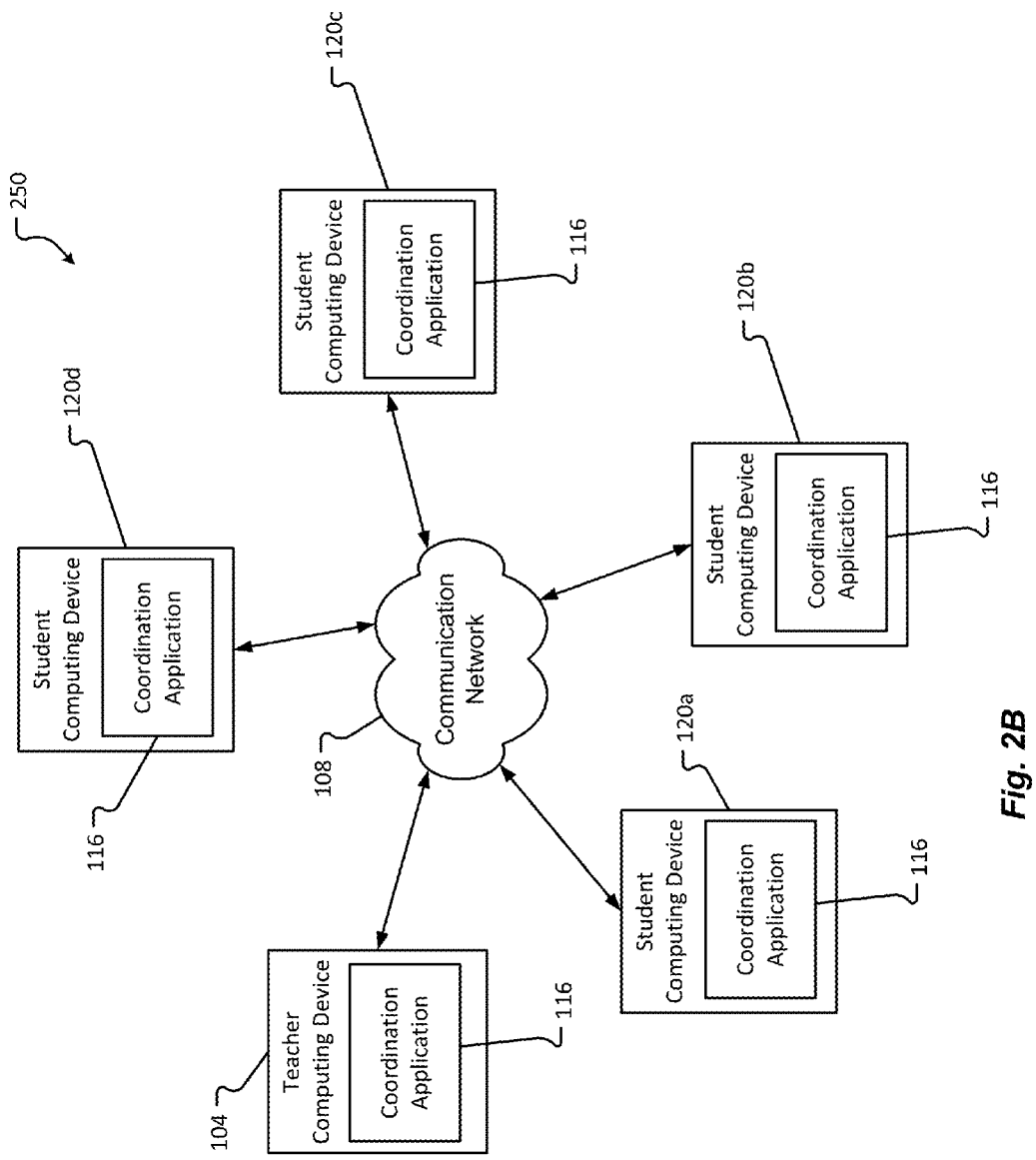
FIG. 2B is a block diagram of a server-less system according to another embodiment of the present disclosure.

FIG. 2B provides a block diagram of a basic server-less one-to-many collaborative system 250 according to still another embodiment of the present disclosure. In system 250, a teacher utilizing a teacher computing device 104 may establish a one-to-many collaborative session directly with a plurality of students using student computing devices 120a, b, c, d, . . . n over a communication network 108, without the use of a communication management server such as the communication management server 112. As with the system 200, one or more computing devices in a system 250 may have stored in computer readable storage medium a coordination application 116 that provides the instructions necessary for the processor(s) of one or more of the participating computing devices to establish a one-to-many collaborative session. The operation of a system 250 is described in more detail with respect to FIG. 9B below.

Figure 3:
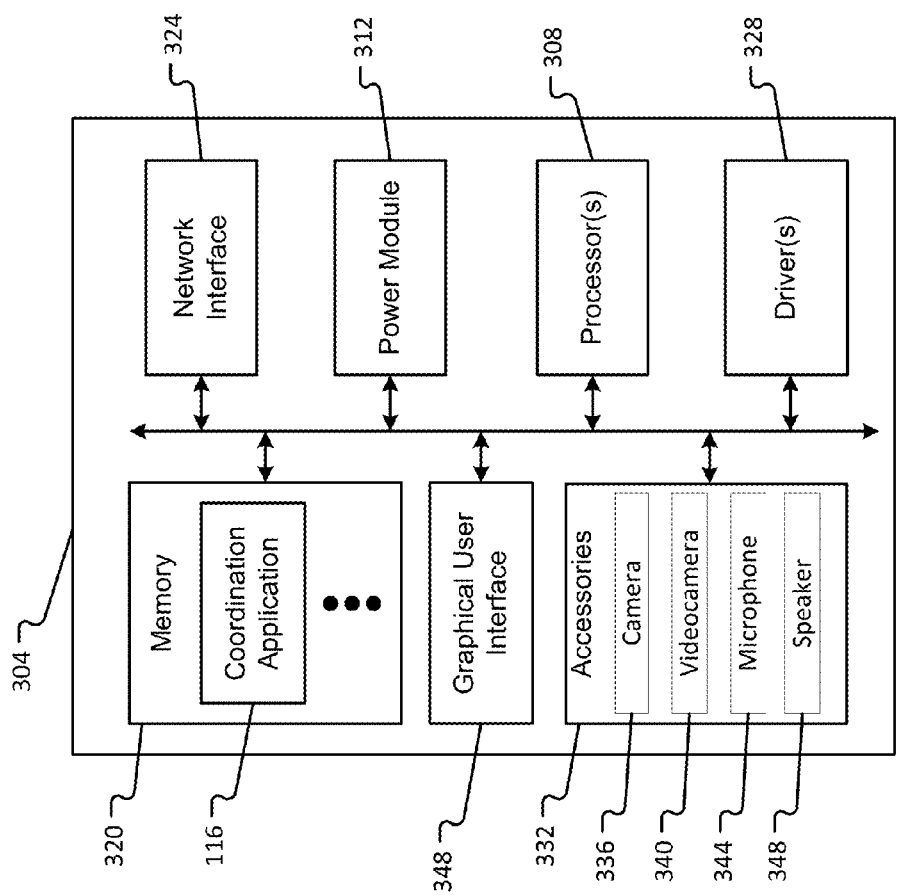
FIG. 3 is a block diagram of a computing device that may be used in embodiments of the present disclosure.

Referring now to FIG. 3, a computing device 304 according to embodiments of the present disclosure that is suitable for use as a teacher computing device or a student computing device may include one or more processors 308, a computer readable storage medium 320 (which, in embodiments, may have stored therein a coordination application 116 that provides needed functionality to implement the systems and/or methods described herein), a network interface 324, a graphical user interface 348, a power module 312, one or more drivers 328, and one or more accessories 332, such as a camera 336, a videocamera 340, a microphone 344, and a speaker 348. Persons of ordinary skill in the art will recognize, based on the present disclosure, that additional or fewer components may be used in a computing device such as computing device 304 to implement the systems and methods of the present disclosure.

A processor 308 as used in embodiments of the present disclosure may correspond to one or many microprocessors that are contained within a common housing, circuit board, or blade with the computer readable storage medium 320. The processor 308 may be a multipurpose, programmable device that accepts digital data as input, processes the digital data according to instructions stored in its internal memory, and provides results as output. The processor 308 may implement sequential digital logic as it has internal memory. As with most microprocessors, the processor 308 may operate on numbers and symbols represented in the binary numeral system. The processor 308 may be or include, without limitation, any one or more of a Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture. The processor 308 executes instructions stored in the computer readable storage medium 320 to initiate, maintain, and terminate collaborative sessions as disclosed herein.

A computer readable storage medium 320 as used in embodiments of the present disclosure may correspond to any type of non-transitory computer-readable medium. In some embodiments, the computer readable storage medium 320 may comprise volatile or non-volatile memory and a controller for the same. Non-limiting examples of a computer-readable storage medium 320 that may be utilized in a computing device 304 include a portable computer diskette, a hard disk, a random access memory (RAM) (including any variety of random access memory, such as dynamic RAM (DRAM) and static RAM (SRAM)), a read-only memory (ROM), an erasable programmable read-only memory (EPROM or EEPROM or Flash memory), an optical fiber, a portable compact disc read-only memory (CD-ROM), an optical storage device, a magnetic storage device, or any suitable combination of the foregoing. The computer readable storage medium 320 stores instructions for execution by the processor 308, including drivers 328, coordination application 116, and software and/or other instructions associated with graphical user interface 348, network interface 324, and/or accessories 332.

A graphical user interface 348 as used in embodiments of the present disclosure may be or include hardware (such as a computer monitor, television screen, laptop screen, tablet screen, smart phone screen, and the like, any one of which may be a resistive, capacitive, surface acoustic wave, or infrared touch screen, an LCD screen, an LED screen, a plasma screen, or a CRT screen), software (such as operating systems, browsers, applications, media players, and the like), or any combination thereof. During a collaborative session according to embodiments of the present disclosure, the graphical user interface 348 provides a visual display of the desktop of computing device 304, of the coordination application 116, and of one or more screens shared by one or more other computing devices. For example, the graphical user interface 348 displays the screenshots depicted in FIGS. 5A through 8B. As discussed elsewhere in the present disclosure, embodiments of the present disclosure beneficially allow a user of a computing device to view both his or her own computer desktop and, simultaneously, one or more computer desktops shared by one or more participants in a collaborative session, all via a graphical user interface 348.

The driver(s) 328 may correspond to hardware, software, and/or controllers that provide specific instructions to hardware components of the computing device 304, thereby facilitating their operation. For instance, the network interface 324, power module 312, accessories 332 (including the camera 336, videocamera 340, microphone 344, and speaker 348), computer readable storage medium 320, and/or graphical user interface 348 may each have a dedicated driver 328 that provides appropriate control signals to effect its/their operation. The driver(s) 328 may also comprise the software or logic circuits that ensure the various hardware components are controlled appropriately and in accordance with desired protocols. For instance, the driver 328 of the network interface 324 may be adapted to ensure that the network interface 324 follows the appropriate network communication protocols (e.g., TCP/IP (at one or more layers in the OSI model), TCP, UDP, RTP, GSM, LTE, Wi-Fi, etc.) such that the network interface 324 can exchange communications via the communication network 108. As can be appreciated, the driver(s) 328 may also be configured to control wired hardware components (e.g., a USB driver, an Ethernet driver, fiber optic communications, etc.).

The network interface 324 may comprise hardware that facilitates communications with other communication devices over the communication network 108. The network interface 324 may include an Ethernet port, a Wi-Fi card, a Network Interface Card (NIC), a cellular interface (e.g., antenna, filters, and associated circuitry), or the like. The network interface 324 may be configured to facilitate a connection between the computing device 304 and the communication network 108 and may further be configured to encode and decode communications (e.g., packets) according to a protocol utilized by the communication network 108. During a collaborative session according to embodiments of the present disclosure, data corresponding to the information displayed on graphical user interface 348 of computing device 304 is sent via the communication network 108 from network interface 324, and information displayed on a graphical user interface of one or more other computing devices participating in the collaborative session is received at the network interface 324 via the communication network 108.

The power module 312 may include a built-in power supply (e.g., battery) and/or a power converter that facilitates the conversion of externally-supplied AC power into DC power that is used to power the various components of the computing device 304. In some embodiments, the power module 312 may also include some implementation of surge protection circuitry to protect the components of the computing device 304, or other associated hardware, from power surges.

Microphone 344 and speaker 348 may be connected to an audio I/O interface to receive and transmit audio information signals between the various components of a system 100, 150, 200, or 250. By way of example, the audio I/O interface may comprise one or more of an associated amplifier and analog to digital converter. Alternatively or additionally, the audio I/O interface may be configured to separate audio information from a media stream provided to, or received by, the communication management server 112. This information may be separated in real-time, or as the information is received by the computing device 304. Microphone 344 and/or speaker 348 may optionally be used during a collaborative session according to embodiments of the present disclosure if a teacher/presenter and/or a student/participant desires to establish an audio communication channel as part of the collaborative session.

Graphical user interface 348 and/or camera 336 and/or video camera 340 may be connected to a video I/O interface, which can be included to receive and transmit video signals through network interface 124 among the various components in a system 100, 150, 200, or 250. Optionally, a video I/O interface can operate with compressed and uncompressed video signals. A video I/O interface can support high data rates associated with image capture devices such as camera 336 and video camera 340. Additionally or alternatively, a video I/O interface may convert analog video signals to digital signals. A video I/O interface may be configured to separate video information from a media stream provided to, or received by, the computing device 304. During a collaborative session according to embodiments of the present disclosure, graphical user interface 348 is used to display a user's computer desktop as well as one or more shared desktop screens from one or more other computing devices participating in the collaborative session. A camera 336 and/or a video camera 340 may optionally be used during a collaborative session according to embodiments of the present disclosure if a teacher/presenter and/or a student/participant desires to establish an additional video communication channel (e.g. providing video signals corresponding to images other than those displayed on the screen of a computing device 304 of a collaborative session, such as images of a teacher or student using a computing device 304) as part of the collaborative session.

Figure 4:
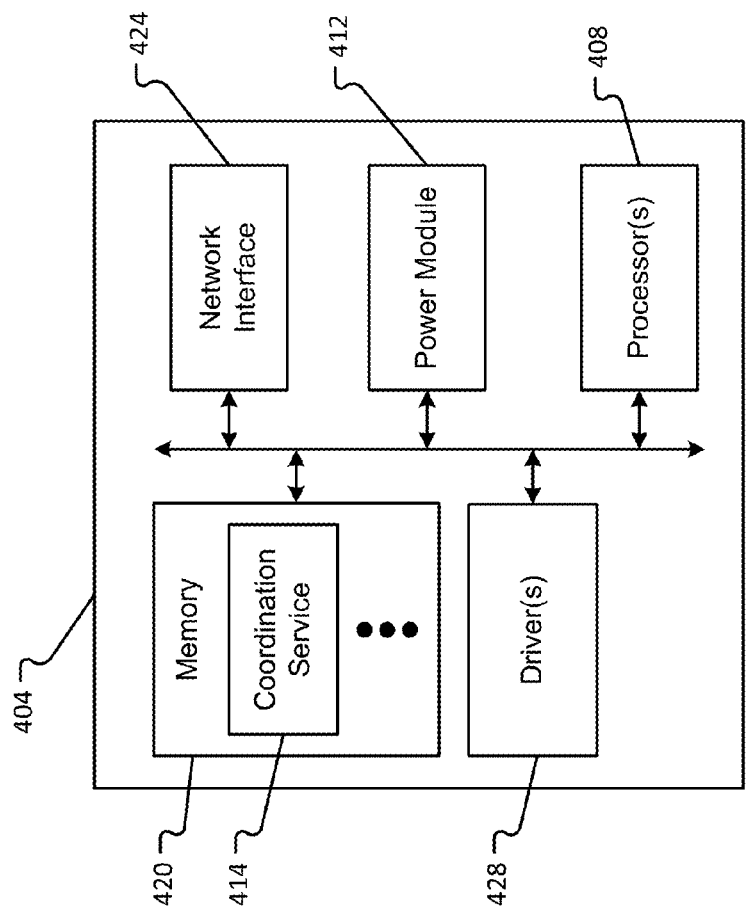
FIG. 4 is a block diagram of server that may be used in embodiments of the present disclosure.

Referring now to FIG. 4, a communication management server 404 may include one or more processors 408, a power module 412, a computer readable storage medium 420 (which, in embodiments, may have stored therein a coordination service 114 that provides instructions for execution by the processor 408 that enable the processor 408 to implement the systems and methods described herein), a network interface 424, and one or more drivers 428. These components may be identical or similar to, and/or have identical or similar purpose and/or functionality as, the corresponding components described above with respect to computing device 304. The server 404 may be located (physically) remotely from any teacher or student computing device, provided that the server 404 is connected to a communication network such as communication network 108 to which a teacher computing device and one or more student computing devices are also (or can be) connected.

Figure 5A:
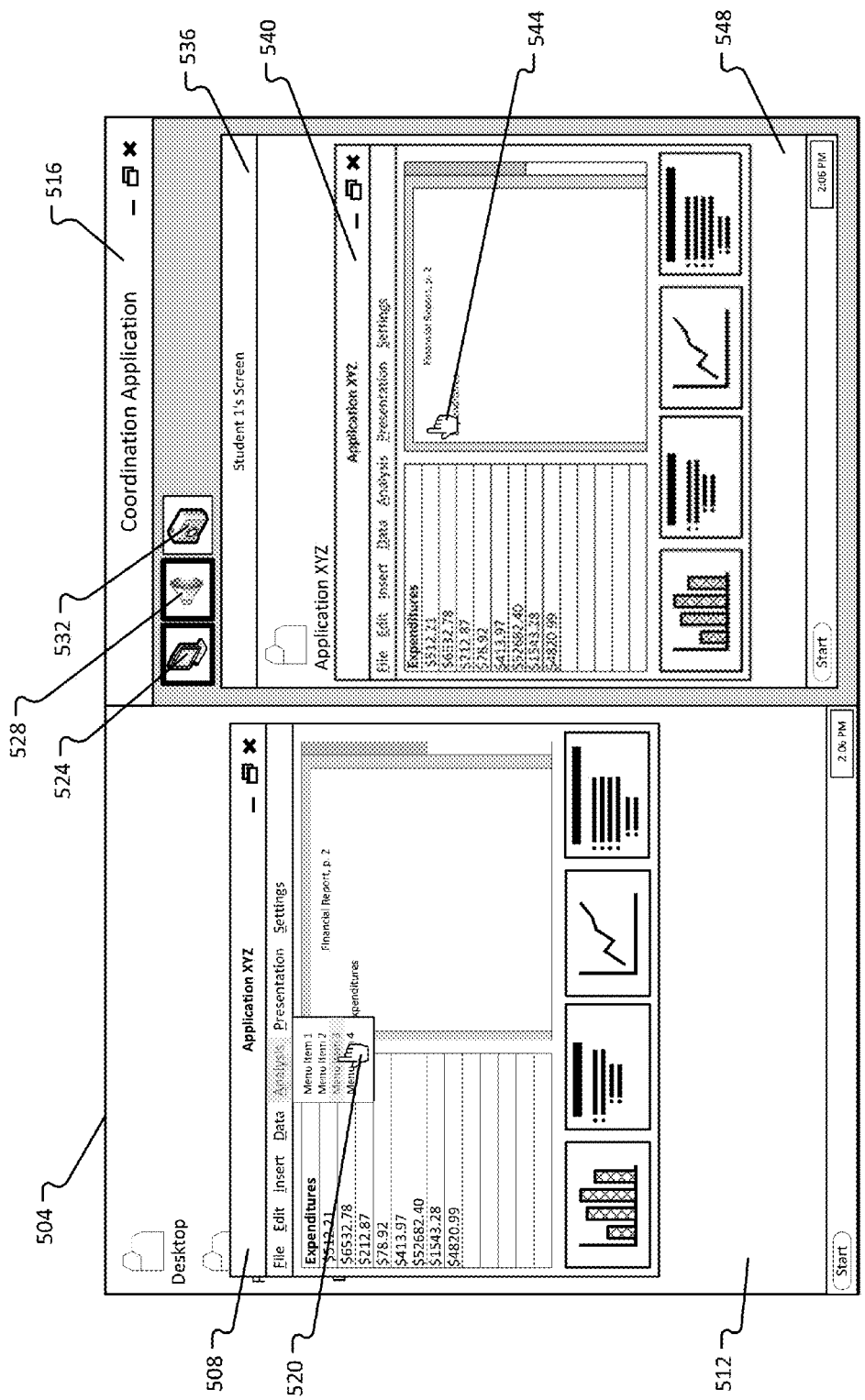
FIG. 5A is a screenshot of a teacher's computer screen according to one embodiment of the present disclosure.

FIG. 5A depicts a screenshot 504 provided on a graphical user interface such as graphical user interface 348 of a teacher computing device 104 that is running a coordination application 116. The coordination application 116 provides a visual display 516 on the graphical user interface of the teacher computing device 104. In the screenshot 504, the coordination application 116 is running in a split-screen mode, where the left half of the screenshot 504 is the teacher's desktop 512, and the right half of the screenshot 504 is a coordination application visual display 516. Persons of skill in the art will recognize, based on this disclosure, that many computing devices are equipped with two screens, and that on such computing devices one screen may be used for the teacher's desktop and the other for the coordination application visual display 516 without having to utilize a split-screen mode. The visual display 516 may include one or more buttons or menus through which a user can establish, join, or exit a collaborative session and that allow the user to select how to share information during a collaborative session. For example, in the embodiment of FIG. 5A, visual display 516 includes three digital buttons which may be selected by the teacher: a share desktop button 524, a share audio button 528, and a share video button 532. The visual display 516 of a coordination application 116 according to embodiments of the present disclosure may include additional or fewer buttons, corresponding to available settings or options that can be selected by the user of the coordination application 116. The visual display 516 also shows the desktop 548 of Student 1 in a student window 536. Thus, the teacher viewing the screenshot 504 can see both the teacher's desktop 512 and Student 1's desktop 548.

As also seen in FIG. 5A, the teacher using a teacher computing device 104 on which the screenshot 504 is displayed is teaching Student 1 how to use an Application XYZ, which is shown in teacher application window 508 and in student application window 540. The teacher is in the process of selecting a menu item within Application XYZ using a cursor 520. Using the coordination application 516, the teacher can watch Student 1's cursor 544 in real time to ensure that Student 1 is properly completing assigned tasks.

In the embodiment depicted in FIG. 5A, the share desktop button 524 and the share audio button 528 are surrounded by a thick line, indicating that those options have been selected by the teacher. The coordination application 116 may be configured so that selection of a share desktop button 524 will automatically cause the teacher's desktop to be shared with any students participating in a collaborative session and will also automatically cause the desktop of participating students to be shared with the teacher. Alternatively, the coordination application 116 may be configured so that selection of the share desktop button 524 will result only in the sharing of the desktop of the user (teacher or student) who selected the button. The same is true of the share audio button 528 and the share video button 532. Thus, in some embodiments, the thick line surrounding the share desktop button 524 and the share audio button 532 of the teacher's coordination application visual display 516 may indicate that the teacher's computer desktop 512 is being shared with Student 1, and that sounds picked up by a microphone connected to the teacher computing device 104 or 204 are also being shared with Student 1. In other embodiments, the thick line surrounding the share desktop button 524 and the share audio button 532 of the teacher's visual display 516 may indicate two-way sharing between the teacher and the student of their respective desktops and audio. Although thick lines are used in FIG. 5A to show that buttons 524 and 528 have been selected, other indications of which buttons have and/or have not been selected may be used without departing from the scope of the present disclosure.

Figure 5B:
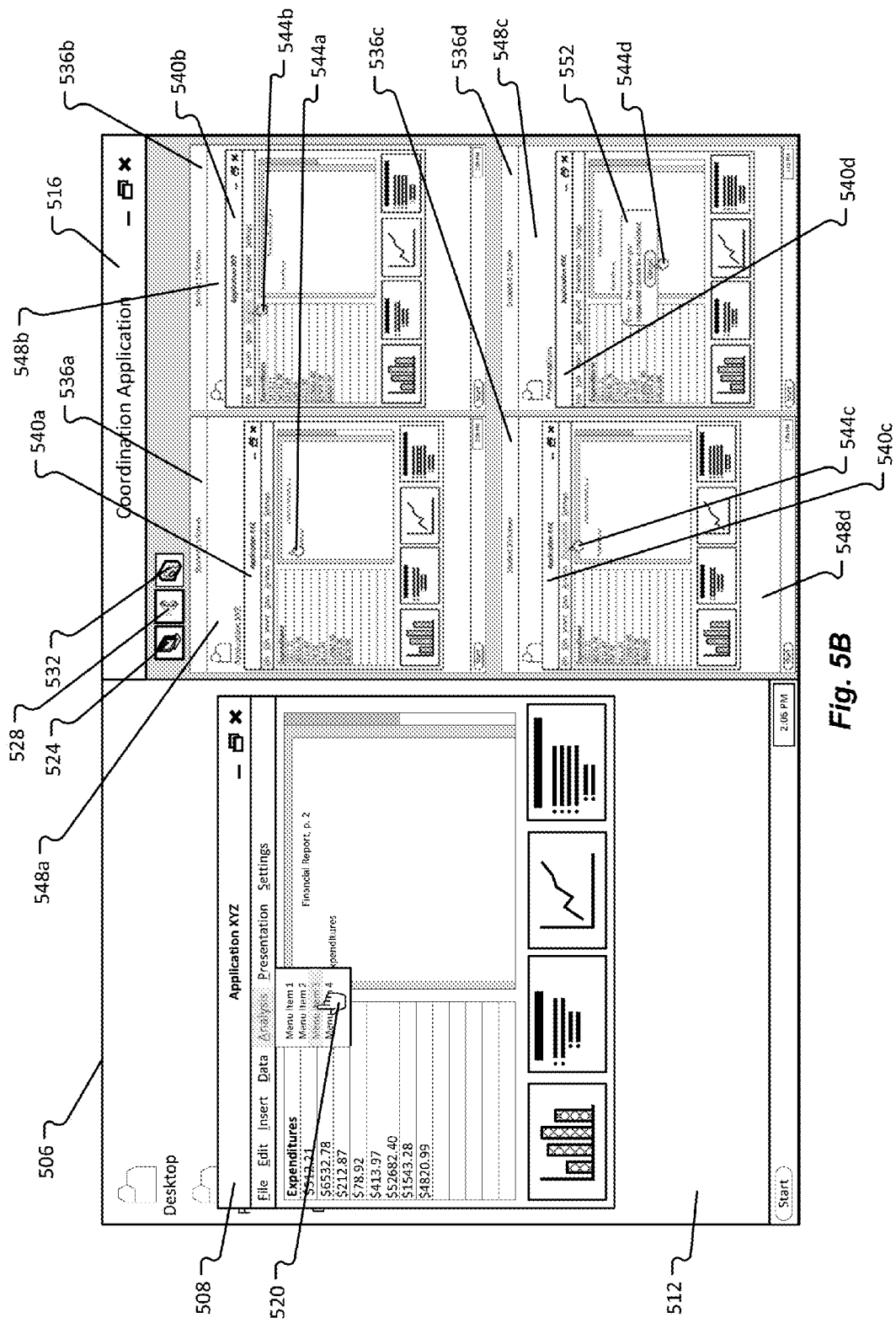
FIG. 5B is a screenshot of the screen of a teacher's computing device according to another embodiment of the present disclosure.

FIG. 5B shows a screenshot 506 of a teacher computing device 104 running a coordination application 116 during a one-to-many collaborative session. In this screenshot 506, the teacher's desktop 512, teacher application window 508, and cursor 520 are all the same as in FIG. 5A. The coordination application 116 is again running in split screen mode, with a visual display 516 on the right hand side of screenshot 506. Share desktop button 524, share audio button 528, and share video button 532 are again included in visual display 516, and have the same functionality as described with respect to FIG. 5A. Rather than displaying only a student window 536 corresponding to the screen of Student 1, however, visual display 516 in FIG. 5B includes student windows 536a, b, c, d, ... n showing the desktops 548a, b, c, d, ... n of each of the students participating in the one-to-many collaborative session. Thus, as the teacher demonstrates how to use Application XYZ on the teacher's desktop 512, the teacher can watch the desktops 548a, b, c, d, ... n, and particularly the cursors 544a, b, c, d, ... n, of the participating students to ensure that each is properly completing assigned tasks. In embodiments, the teacher may be able to select one of student windows 536a, b, c, d, ... n to be enlarged (e.g. so that the teacher can better see what is happening on the selected student window), whether by clicking on the student window to be enlarged, or by selecting a button or other toggle adjacent the student window to be enlarged, or by other suitable means.

Figure 6:
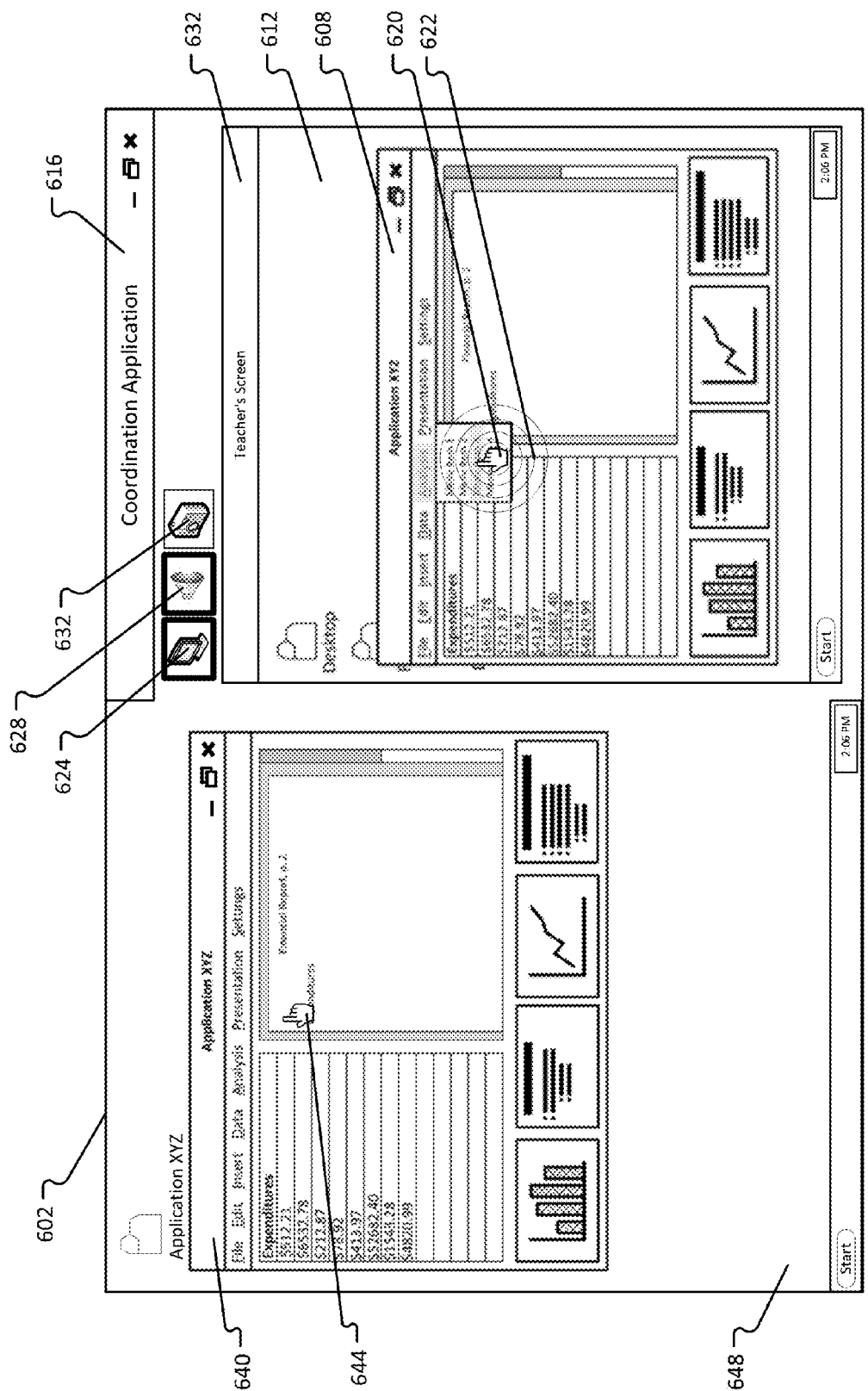
FIG. 6 is a screenshot of the screen of a student's computing device according to embodiments of the present disclosure.

FIG. 6 depicts a screenshot 602 of a student computing device 120 of a student participating in a one-to-one collaborative session or in a one-to-many collaborative session. Although the systems and methods disclosed herein include embodiments in which students participating in a collaborative session share their desktops with other students, students, in a one-to-one or one-to-many collaborative session only see their own desktop 648 and the teacher's desktop 612. As seen in screenshot 602, the student can watch the teacher manipulate the teacher's cursor 620 to operate Application XYZ in teacher application window 608, which is visible in teacher window 632.

Particularly in embodiments of the present disclosure used for teaching students how to use a computer application, and in other instances it may be important for a teacher or student to determine when a student or teacher, respectively, is clicking his or her mouse, a coordination application 116 may be configured to provide one or more indications of mouse clicks by a teacher and/or one or more students in a collaborative session. For example, the collaboration application 116 may be configured to provide a visual indication to students participating in a collaborative session whenever the teacher in the session clicks her mouse. The visual indication may be a color change (e.g. changing an edge color of window, or the background color of a window or screen), a change in relative size of one graphical element to another, an animation, a flashing screen or flashing cursor, or any other visual indication. In screenshot 602, a visual indication 622 of circles radiating from the teacher's cursor 620 indicates that the teacher has clicked his or her mouse. The collaboration application 116 may also be configured to provide one or more audible indications of mouse clicks, and/or one or more sensory indications of mouse clicks (e.g. a brief vibration of a computing device 404 that is a mobile device).

In embodiments, a teacher in a one-to-many collaborative session may be confused by constant indications of mouse clicks by students participating in the session. Accordingly, the collaboration application 116 may be configured to allow the teacher to select a particular student screen 536*a, b, c, d, . . . n* with respect to which indications of mouse clicks by the student using that particular screen will be provided to the teacher. The selection may be made, for example, by clicking or tapping on the student screen, mousing over the student screen, using a cursor (or, if the teacher computing device comprises a touchscreen, a finger) to draw a circle or other shape around the student screen, or any other known selection method.

In embodiments of the present disclosure, a coordination application 116 (or a coordination service 114) may be programmed to compare one or more attributes of a display on a graphical user interface of a teacher computing device 104 with one or more attributes of a display on a graphical user interface of a student computing device 120. For example, a coordination application 116 may be programmed to compare the average location (e.g., average horizontal distance from a predetermined y axis and average vertical distance from a predetermined x axis) of a teacher's cursor 720 over a given period of time with the average location of each student's cursor 744*a, b, c, d, . . . n* over time, and to highlight the screen(s) of any student(s) whose average cursor location differs from the average cursor location of the teacher by more than a predetermined amount. The location of the teacher's cursor and/or of the student's cursor may also be determined relative to a graphical element from among the graphical elements that are shared by the teacher computing device with the student computing device and/or vice versa, or the location of the teacher's cursor and/or of the student's cursor may be determined relative a graphical element that is not included among the graphical elements that ared by the teacher computing device with the student computing device and/or vice versa. As another example, a coordination application 116 may be programmed to compare the number of windows or dialogue boxes (or attributes of one or more windows or dialogue boxes) displayed on the teacher's graphical user interface at any given time with the number of windows or dialogue boxes (or attributes of one or more windows or dialogue boxes) displayed on each student's graphical user interface. If those numbers (or attributes) are not equal or sufficiently similar, the coordination application 116 may be programmed to highlight the screen(s) of any student(s) for whom the numbers are not equal. In this way, the teacher can quickly identify students who may be having difficulty completing assigned tasks and/or who may not be properly participating in the collaborative session.

Figure 7:
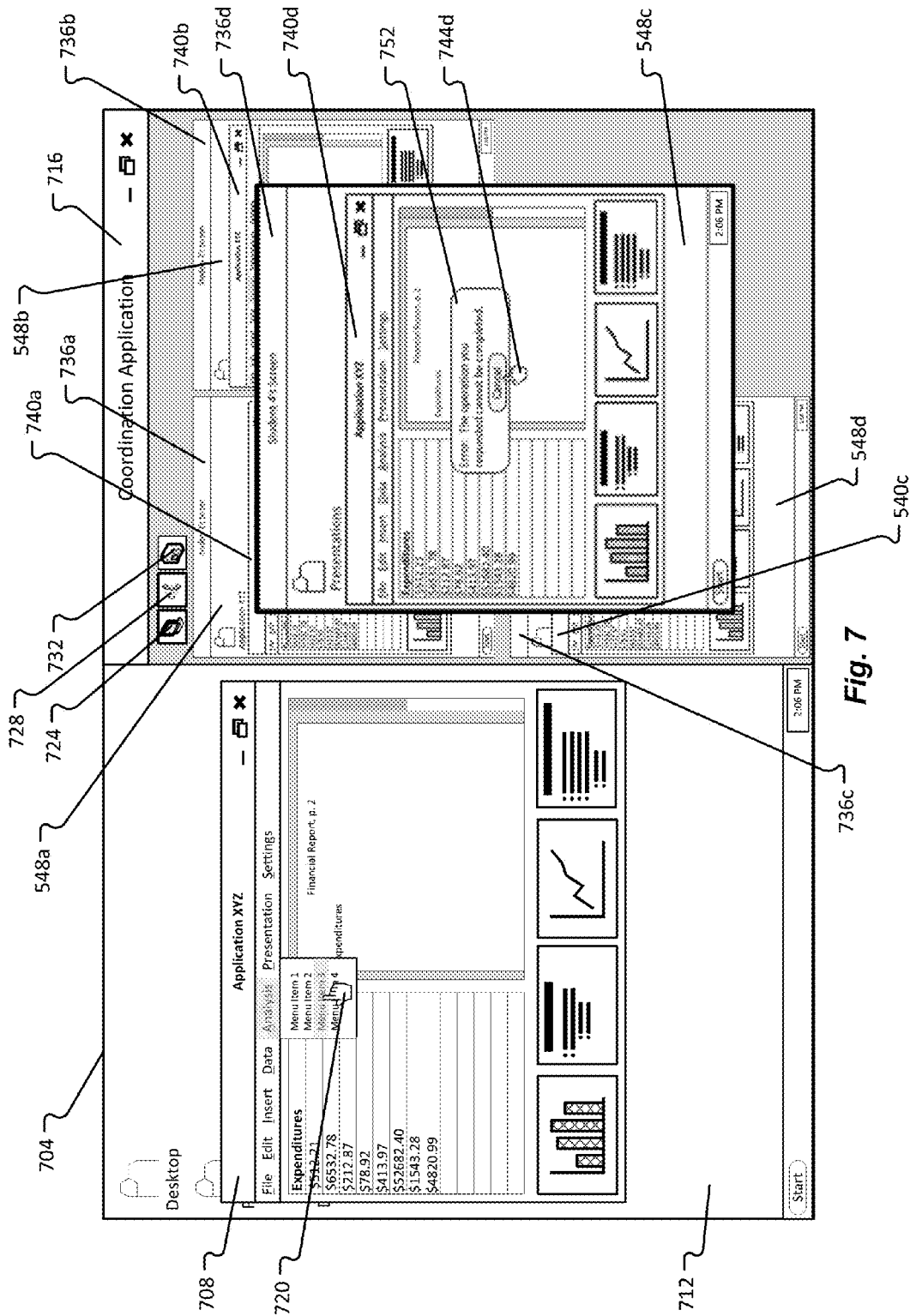
FIG. 7 is another screenshot of the screen of a teacher's computing device according to embodiments of the present disclosure.

Highlighting the screen of a student who may be having difficulty or who otherwise requires attention may be done in several ways. In FIG. 7, for example, the screen 736*d* of a student who has received an error message 752 is enlarged and centered in the middle of the teacher's coordination application visual display 716. The screen 736*d* is further surrounding by a thick border. By highlighting screen 736*d* in this way, the teacher viewing screenshot 704 can quickly determine which student is having difficulty as well as the nature of the difficulty, and can provide any needed instruction to address the difficulty and get the student in question back on track. In embodiments, highlighting a student's screen may include one or more of changing the size of the student's screen (on the visual display 716) relative to its original or default size and/or relative to the size of other student screens appearing on the visual display 716; placing or enhancing a border around the student's screen; changing the color of some or all of the student's screen or of an edge of a window within the student's screen or of the student's screen itself; flashing the student's screen; graying out the remaining student screens; and so forth. In embodiments, a student screen 736 may remain highlighted, for example, until the condition that caused the coordination application 116 or the coordination service 114 to highlight the screen is no longer present, or until the teacher provides an input (e.g. clicking on the student screen 736) that causes the student screen 736 to return to its original size and formatting, or for a given period of time.

Screen highlighting as described above may be useful for other purposes as well. For example, the coordination application may be programmed to highlight the screen of a student who has not moved his or her cursor for a given period of time. A student may be able to press a button that causes his or her screen to be highlighted on the teacher's computing device, thus indicating that the student has a question or otherwise needs assistance. In some embodiments, the coordination application may be programmed to track the mouse clicks and/or actions of each student participating in a collaborative session, and to compare the mouse clicks and/or actions of each student with the mouse clicks and/or actions of the other students. For example, if most participating students have clicked their mouse five times, but one participating student has clicked his or her mouse only two times (or, as another example, nine or ten times), then the coordination application may highlight, on the teacher's computing device, the screen of the student whose mouse clicks are different than those of the majority of the students. In some embodiments, the coordination application may be programmed to determine the average number of mouse clicks of every participating student, and to highlight the screen of any student whose number of mouse clicks is more than one standard deviation higher or lower than the average number of mouse clicks. As another example of when screen highlighting may be based on the tracking of participating students' clicks and/or actions, the coordination application may be programmed to track actions taken by each participating student on each student's respective student computing device in a collaborative session, and to highlight the screen of any student who does not take an action that was taken by a majority (or some other minimum threshold) of other participating students within a predetermined amount of time. In this way, each student's progress is compared not against the teacher, who may be able to complete actions or tasks more readily than any student, but against each other, thus allowing the teacher to determine how particular students are doing compared to other students in the session.

While screen highlighting is one way to notify a teacher of one or more students who are not keeping pace with other students in a collaborative session, other notification options are within the scope of the present disclosure. For example, notifications may involve playing a sound (which may or may not identify the student or students meeting the notification criteria), updating or displaying a message (e.g. periodically updating a list of students who meet the notification criteria, identified by name, number, symbol, or otherwise), displaying one or more graphics (e.g. displaying, on the teacher computing device, one or more arrows pointing toward the screen or screens of the student or students who meet the notification criteria), sending an email to the teacher identifying the student(s) in question, or the like.

Figure 8A:
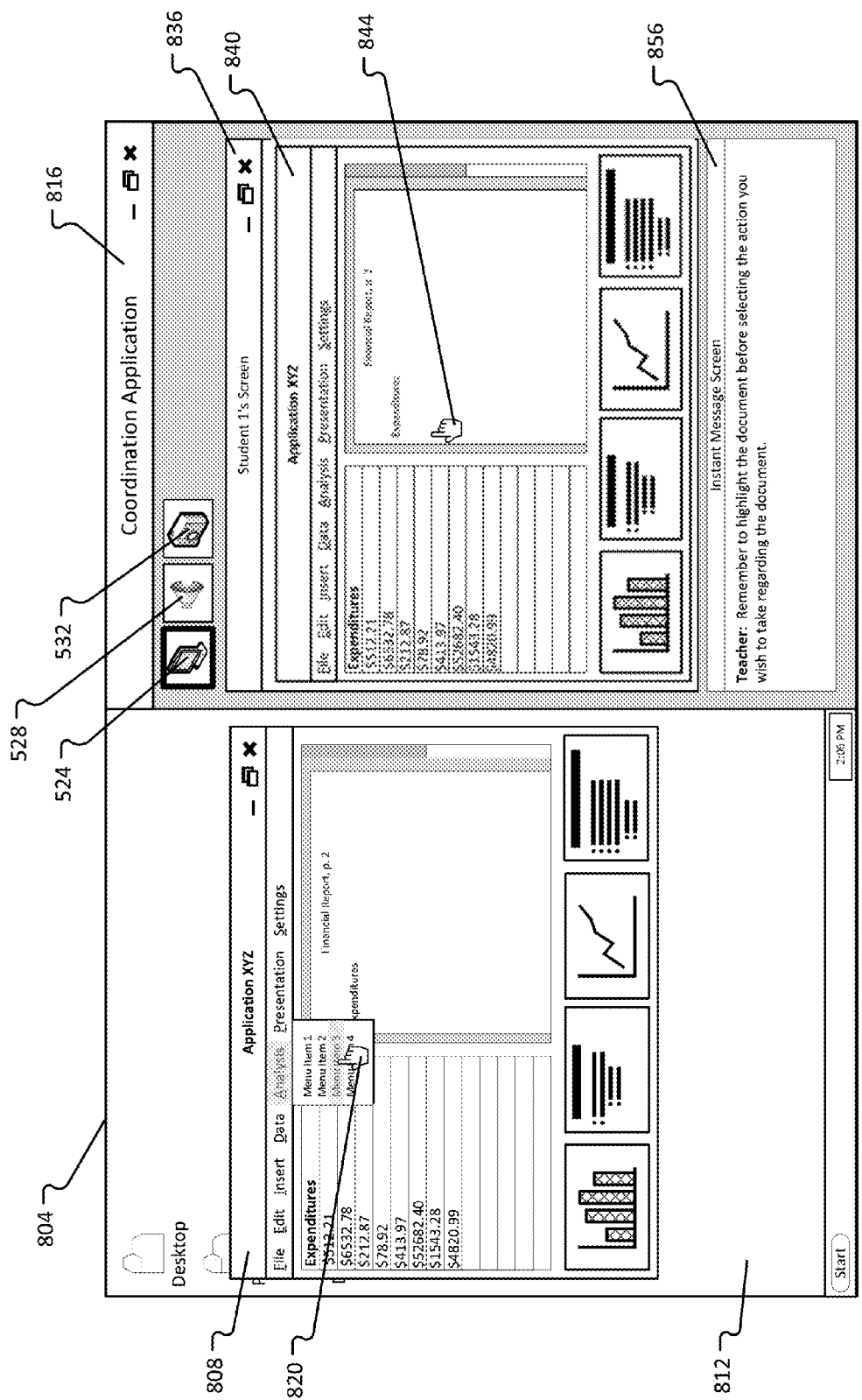
FIG. 8A is a screenshot of the screen of a teacher's computing device according to yet another embodiment of the present disclosure.
Figure 8B:
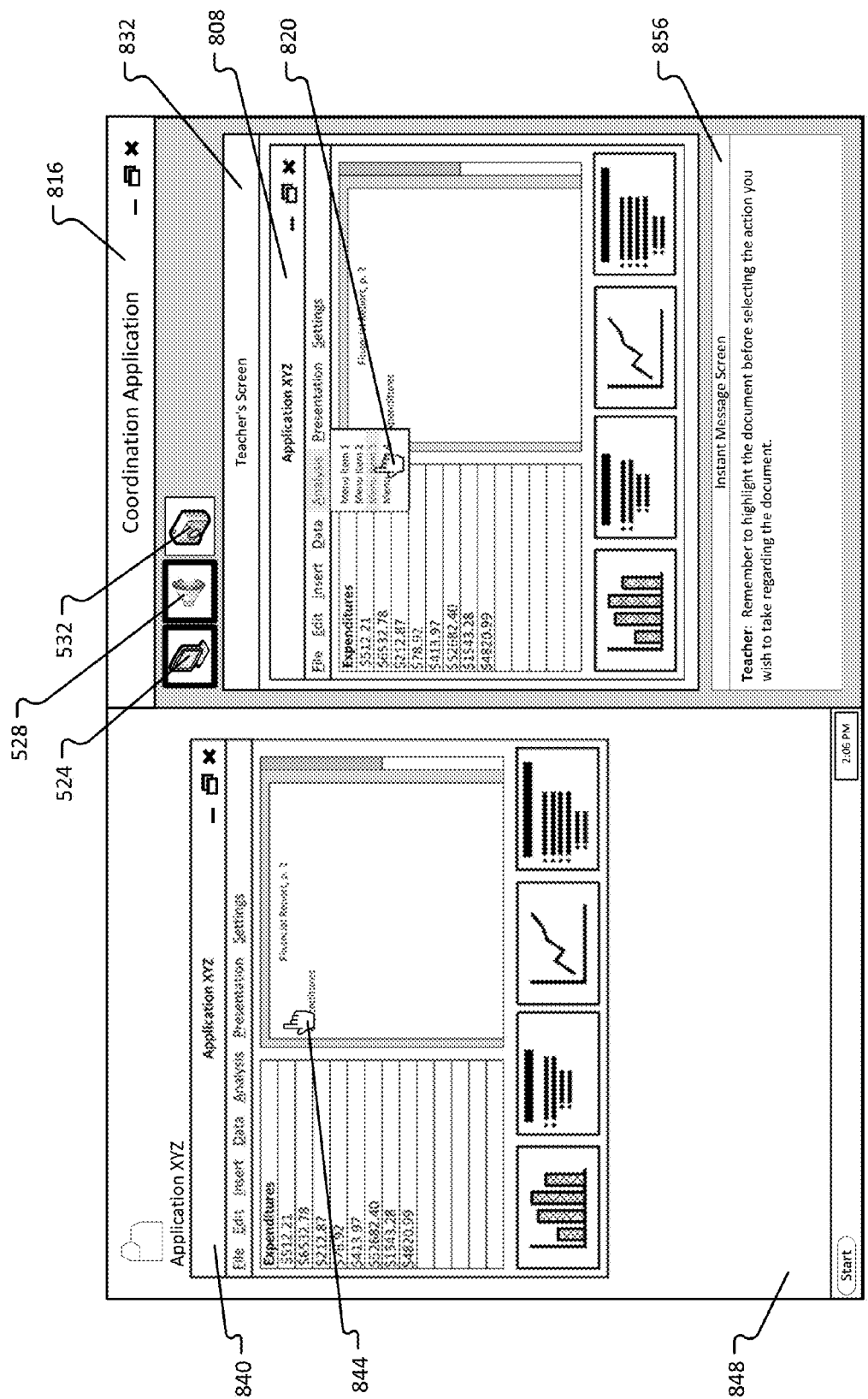
FIG. 8B is a screenshot of the screen of a student's computing device in the embodiment of FIG. 8A.

Referring now to FIGS. 8A and 8B, a coordination application visual display 816 may display on a student screen 836 only one window (e.g. student application window 840) of the student's desktop to the teacher, and on a teacher screen 832 only one window (e.g. teacher application window 808) of the teacher's desktop to the student. The shared/displayed window may be chosen by the user, or it may be the active window on the user's desktop, or it may be determined automatically by the coordination application 116 or by the coordination service 114. For example, the teacher or student may program the coordination application 116 or 216 or the coordination service 114 to know that each user's instance of Application XYZ should be shared during a collaborative session. Alternatively, the coordination application 116 or the coordination service 114 may monitor which window a given user is currently using (e.g. which window is active) and share that window (or the corresponding window, such that if the teacher selects a new window, the student screen 836 automatically displays the student's corresponding window) as needed. This may be a useful option particularly when the instruction or presentation being given requires switching around between windows or programs on a computer desktop. The ability to share less than all of a user's desktop—which effectively allows users to multi-task without the knowledge of other users—may be well-suited for environments in which participants are not obligated to participate or for environments in which privacy is of greater concern than educational outcome (e.g. a collaborative session between participants from two different companies). On the other hand, sharing of the entirety of a user's desktop, such that, for example, a student's multitasking would be visible to a teacher, may be well-suited for traditional educational environments, such as when a student's participation in the collaborative session is obligatory (whether for grading purposes or otherwise).

In embodiments, participants in a collaborative session may communicate with each other via instant messaging. In FIGS. 8A-8B, for example, an instant messaging screen 856 allows the teacher and student(s) to type messages to each other. The use of instant messaging as part of a collaborative session may be particularly useful when audio is not being shared among participants in the session. In embodiments, the coordination application 116 and/or the coordination service 214 may record collaborative sessions for later review by the teacher and/or student, or for future students, or for archival purposes. This may be advantageously used in connection with instant messaging, as questions or comments transmitted via instant messaging can be reviewed in the context of what was happening in the collaborative session around the time of transmission.

In some embodiments, the context of a given collaboration session may be such that each participant wishes to see the screens of every other participant in addition to the screen of the presenter. This may be accomplished by ensuring that every computing device both sends information corresponding to its own set of graphical elements to every other computing device and receives information corresponding to the set of graphical elements displayed on every other computing device. The various sets of graphical elements received by a given computing device can then be displayed in the same manner as or in a similar manner to the display of the various student screens depicted in FIG. 5B. In some such embodiments, the presenter's screen may be modified to stand out from other participants' screens, e.g. with a different border, a different color, a different size, or otherwise. Additionally, each participant may be able to enlarge any particular screen by selecting the desired screen or by selecting a digital button or other toggle corresponding to the desired screen. In some embodiments, one screen may enlarge automatically based on, for example, a level of activity corresponding to the screen, or, if an audio communication channel has been established with the presenter and participants of the collaborative session, based on which presenter or participant is speaking (e.g., when the presenter speaks, the presenter's screen as provided in the visual display 516 of each participant may be automatically enlarged on the visual display 516 of each participant).

Figure 9A:
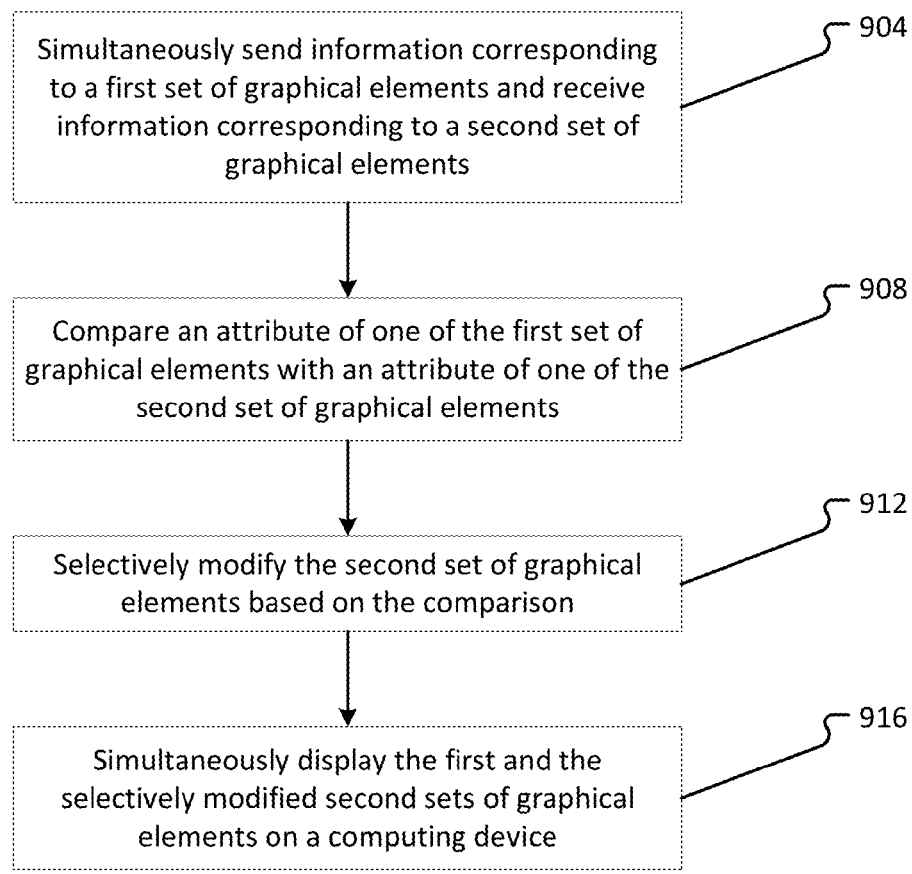
FIG. 9A is a flow diagram of a method according to an embodiment of the present disclosure.

FIG. 9A provides a flow diagram of a method corresponding to a one-to-one collaborative session according to embodiments of the present disclosure. The method described in FIG. 9A does not require the use of a communication management server 112 with a coordination service 114. According to one embodiment of the present disclosure, a computing device used in a collaborative session simultaneously sends information corresponding to a first set of graphical elements via a network interface and receives information corresponding to a second set of graphical elements via the network interface (step 904). The first and second sets of graphical elements may be, for example, the graphical elements on the teacher's and student's desktops, respectively, or they may be, as another example, the graphical elements of one window on the teacher's and student's desktops. The information corresponding to the first and second sets of graphical elements is sufficient to allow a computing device to display both the first and second sets of graphical elements on a graphical user interface.

The computing device (through a processor therein running instructions stored in a computer readable storage medium of the computing device) may compare an attribute of one of the first set of graphical elements with an attribute of one of the second set of graphical elements (step 908). For example, the computing device may compare the location of a cursor from the first set of graphical elements with the location of a cursor from the second set of graphical elements. Based on the comparison, the computing device may selectively modify the second set of graphical elements (step 912). For example, if the cursor from the second set of graphical elements has approximately the same location as the cursor from the first set of graphical elements, then no modification may occur. However, if the cursor from the second set of graphical elements has a materially different location than the location of the cursor from the first set of graphical elements, then the computing device may modify the second set of graphical elements to include a visual indication that draws attention to the cursor from the second set of graphical elements, or that draws attention to the entire second set of graphical elements.

Continuing with the method of FIG. 9A, the computing device simultaneously displays the first and the selectively modified second sets of graphical elements (step 916). By simultaneously sending and receiving information about the first and second sets of graphical elements and simultaneously displaying the first and (selectively modified) second sets of graphical elements, a computing device allows a teacher to both provide instruction and verify that a student is correctly following that instruction, or alternatively allows a student to both receive instruction and implement or practice that instruction in real time, under the watchful eye of the teacher. The method described herein thus allows for more effective and efficient learning.

Figure 9B:
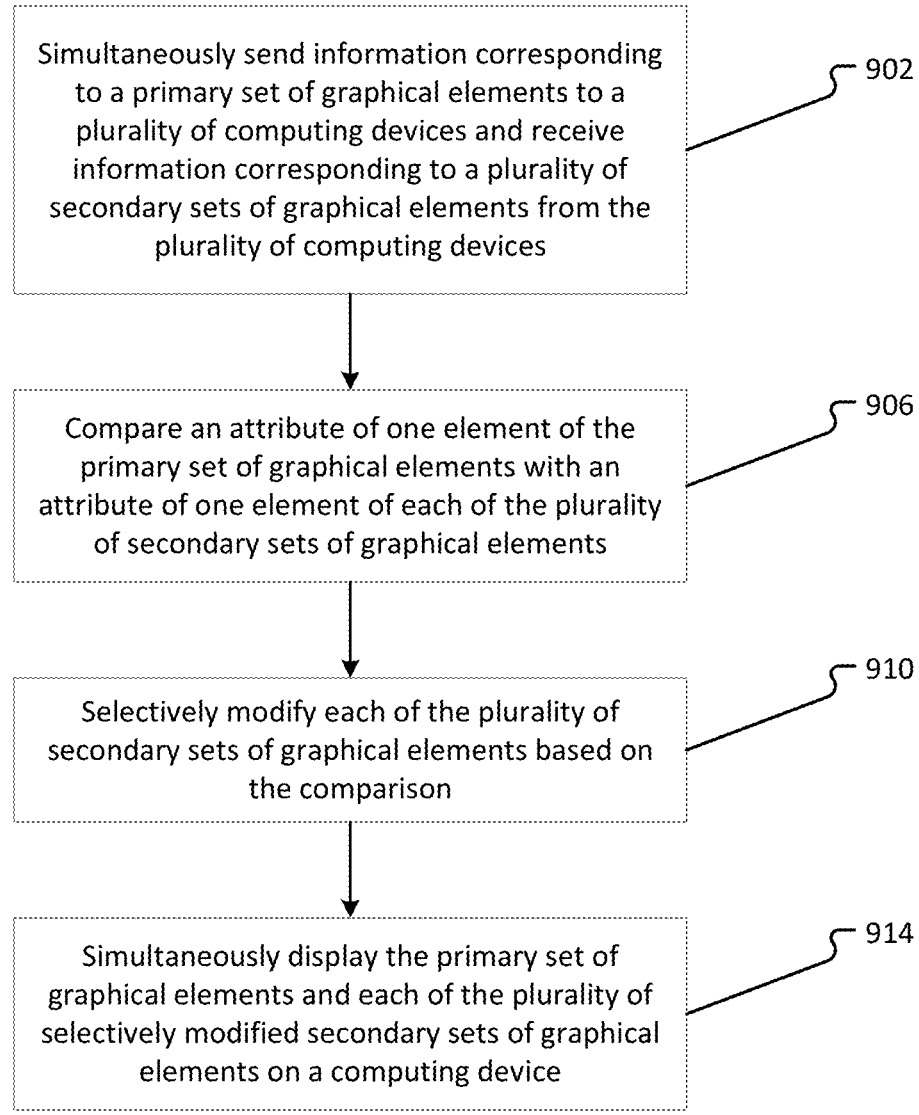
FIG. 9B is a flow diagram of a method according to another embodiment of the present disclosure.

FIG. 9B provides a flow diagram of a method corresponding to a one-to-many collaborative session according to embodiments of the present disclosure. Like the method described in FIG. 9A, the method described in FIG. 9B does not require the use of a communication management server 112 with a coordination service 114. According to one embodiment of the present disclosure, a computing device used in a collaborative session simultaneously sends information corresponding to a primary set of graphical elements to a plurality of computing devices via a network interface and receives information corresponding to a plurality of secondary sets of graphical elements from the plurality of computing devices via the network interface (step 902). The primary and secondary sets of graphical elements may be, for example, the graphical elements on a teacher's and students' desktops, respectively, or they may be, as another example, the graphical elements of one window on the teacher's and students' desktops. The information corresponding to the primary set of graphical elements and to the plurality of secondary sets of graphical elements is sufficient to allow a computing device to display the primary set of graphical elements and each of the plurality of secondary sets of graphical elements on a graphical user interface.

The computing device (through a processor therein running instructions stored in a computer readable storage medium of the computing device) may compare an attribute of one element of the primary set of graphical elements with an attribute of one element of each of the plurality of secondary sets of graphical elements (step 906). Based on the comparison, the computing device may selectively modify each of the plurality of secondary sets of graphical elements (step 910). The computing device simultaneously displays the primary set of graphical elements and each of the plurality of selectively modified secondary sets of graphical elements (step 914). By simultaneously sending and receiving information about the primary and the plurality of secondary sets of graphical elements and simultaneously displaying the primary and each of the plurality of selectively modified secondary sets of graphical elements, a computing device allows a teacher to both provide instruction and verify that a plurality of students are correctly following that instruction, or alternatively allows each of a plurality of students to both receive instruction and implement or practice that instruction in real time, under the watchful eye of the teacher.

The steps of the method described in FIGS. 9A and 9B are carried out by a processor such as processor 308 executing instructions stored in a computer readable storage medium such as computer readable storage medium 320. The processor utilizes a network interface such as network interface 324 to send and receive information over a communication network such as communication network 108.

Figure 10A:
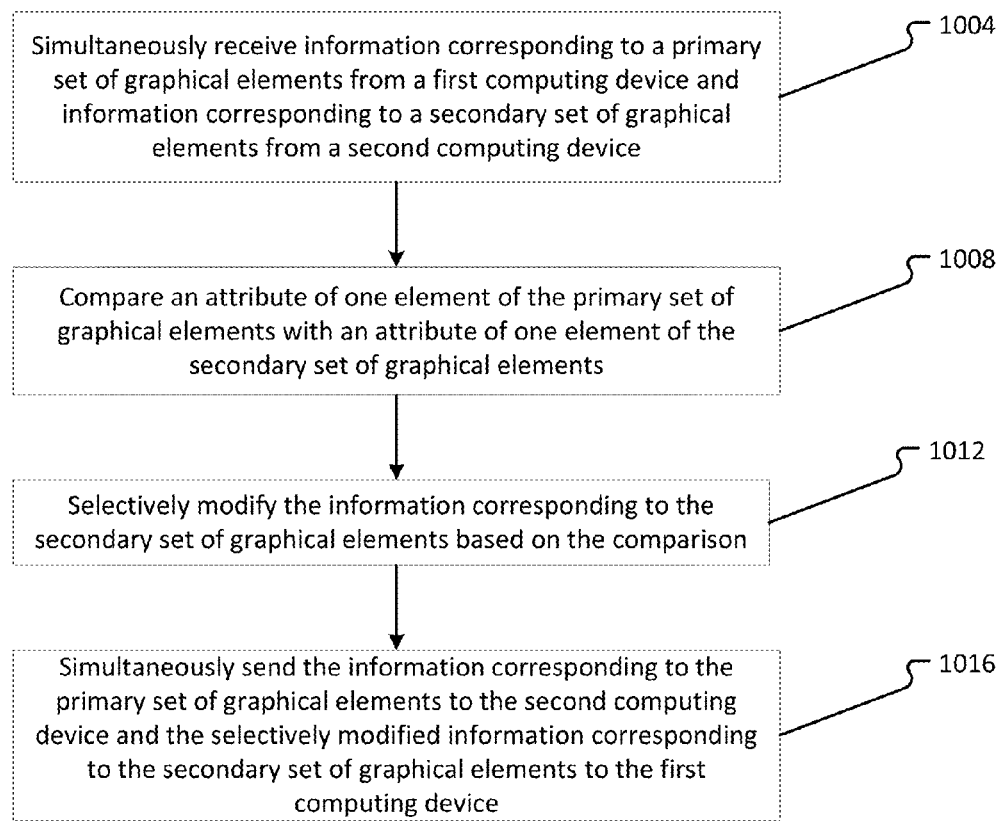
FIG. 10A is a flow diagram of a method according to yet another embodiment of the present disclosure.

Referring now to FIG. 10A, in an embodiment of the present disclosure that utilizes a communication management server 112 running a coordination service 114 to establish a one-to-one collaborative session, the server 112 simultaneously receives information corresponding to a primary set of graphical elements from a first computing device and information corresponding to a secondary set of graphical elements from a second computing device (step 1004). The information corresponding to the primary set of graphical elements and the information corresponding to the secondary set of graphical elements is sufficient to allow a computing device to display the primary set of graphical elements and the secondary set of graphical elements on a graphical user interface of the computing device.

Through a processor executing instructions stored in a computer readable storage medium, the server compares an attribute of one element of the primary set of graphical elements with an attribute of one element of the secondary set of graphical elements (step 1008), and selectively modifies the information corresponding to the secondary set of graphical elements based on the comparison (step 1012). The server then simultaneously sends the information corresponding to the primary set of graphical elements to the second computing device and the selectively modified information corresponding to the secondary set of graphical elements to the first computing device (step 1016).

By simultaneously receiving information about the primary and secondary sets of graphical elements and simultaneously sending information about the primary set of graphical elements and the selectively modified information about the secondary set of graphical elements, the server allows a teacher or student computing device to display the primary and selectively modified secondary sets of graphical elements simultaneously. This, in turn, allows the teacher to both provide instruction and verify that the student is correctly following that instruction, and allows the student to both receive instruction and implement or practice that instruction in real time, under the watchful eye of the teacher.

Figure 10B:
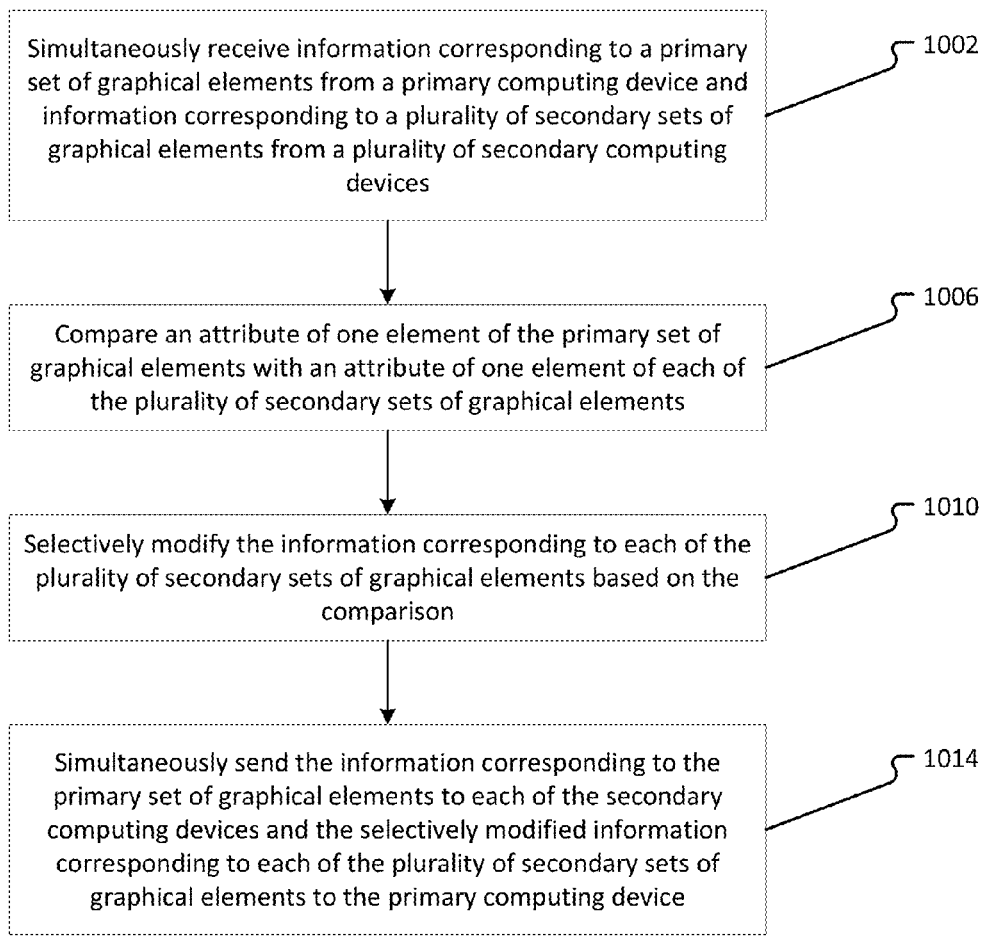
FIG. 10B is a flow diagram of a method according to still another embodiment of the present disclosure.

FIG. 10B provides a flow diagram of a method according to an embodiment of the present disclosure that utilizes a communication management server 112 running a coordination service 114 to establish a one-to-many collaborative session. The server 112 simultaneously receives information corresponding to a primary set of graphical elements from a primary computing device and information corresponding to a plurality of secondary sets of graphical elements from a plurality of secondary computing devices (step 1002). The information corresponding to the primary set of graphical elements and the information corresponding to the plurality of secondary sets of graphical elements is sufficient to allow a computing device to display the primary set of graphical elements and each of the plurality of secondary sets of graphical elements on a graphical user interface.

The server 112 then compares an attribute of one element of the primary set of graphical elements with an attribute of one element of each of the plurality of secondary sets of graphical elements (step 1006), and selectively modifies the information corresponding to each of the plurality of secondary sets of graphical elements based on the comparison (step 1010). The server simultaneously sends the information corresponding to the primary set of graphical elements to each of the secondary computing devices and the selectively modified information corresponding to each of the plurality of secondary sets of graphical elements to the primary computing device (step 1014).

By simultaneously receiving information about the primary and the plurality of secondary sets of graphical elements and simultaneously sending the information corresponding to the primary set of graphical elements and the selectively modified information corresponding to each of the plurality of secondary set of graphical elements, the server allows both teacher and student computing devices to display the primary and the selectively modified plurality of secondary sets of graphical elements simultaneously. This, in turn, allows the teacher to both provide instruction and verify that the students are correctly following that instruction, and allows the students to both receive instruction and implement or practice that instruction in real time, under the watchful eye of the teacher.

The steps of the method described in FIGS. 10A and 10B are carried out by a processor such as processor 408 executing instructions stored in a computer readable storage medium such as computer readable storage medium 420. The processor utilizes a network interface such as network interface 424 to send and receive information over a communication network such as communication network 108.

Figure 11:
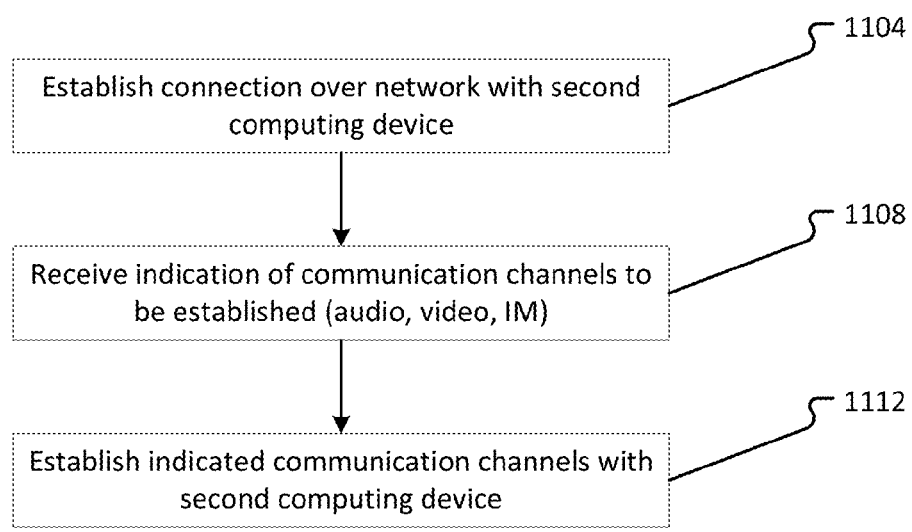
FIG. 11 is a flow diagram of a method according to embodiments of the present disclosure.

FIG. 11 provides a flow diagram of a portion of a method that may be used, for example, in conjunction with the method depicted in FIG. 9A. According to the method of FIG. 11, a first computing device establishes a connection over a communications network with a second computing device (step 1104). The first computing device may communicate with the second computing device across a communication network either directly or via a communication management server such as communication management server 112 discussed above. The communications may occur, at least initially, according to the Session Initiation Protocol, or any other protocol useful for establish communications between or among computing devices. In some embodiments, a standard signaling or network communication protocol may be used to establish communications, and a different protocol may be used once communications are established. Instructions for communicating via the different protocol may be included, for example, in a coordination application such as coordination application 116, and/or in a coordination service such as coordination service 114. The different protocol may be a proprietary protocol or it may be a different standard protocol, such as real-time transport protocol (RTP) or secure real-time transport protocol (SRTP). Additionally, multiple protocols may be used simultaneously or sequentially during establishment and maintenance of the collaborative session. For example, RTP or SRTP may be used to carry both audio and video streams between or among computing devices in a collaborative session, and RTP control protocol (RTCP) may be used to monitor transmission statistics and quality of service and to aid in synchronization of the various media streams The first computing device receives an indication of the communication channels to be established with the second computing device, which may include (in addition to desktop sharing) audio sharing, video sharing, and instant messaging (step 1108). The indication of which communication channels to establish may be generated in response to the selection of one or more buttons or other options or settings by a user of the first computing device, or it may be generated in a similar manner by a user of the second computing device and received by the first computing device via the communications network from the second computing device. The indication may also be routed from or initiated by a communication management server such as communication management server 112. The communication channels desired by a teacher or student or other collaborative session presenter or participant may change during the course of the collaborative session, in which case an existing communication channel (e.g. an audio communication channel) may be closed or otherwise terminated, and a new communication channel (e.g. an instant messaging communication channel) may be opened or otherwise initiated. Any appropriate protocol may be used to initiate or terminate communication channels as needed during the course of a collaborative session.

The first computing device establishes the indicated communication channels with the second computing device (step 1112). For example, if the indicated communication channels were a desktop sharing communication channel and an audio communication channel, the first computing device would establish a desktop sharing communication channel and an audio communication channel with the second computing device. This may include, for example, utilizing a video I/O interface to compress and decompress video signals for transmission via a network interface of the computing device, as well as activation of a microphone and speaker as well as an audio I/O interface to manage the transmission of electrical signals corresponding to audio signals and the proper routing thereof from a microphone to a network interface for transmission across a communication network, and from the network interface to a speaker for reproduction of the audio signals. Again, any appropriate protocol may be used to establish communication channels (or to close them, as the case may be). Based on this disclosure, persons of ordinary skill in the art would understand how to adapt the disclosed steps of FIG. 11 for use with the methods depicted in FIGS. 9B (including by establishing connections and communication channels with each of a plurality of computing devices), 10A (including by establishing connections and communication channels between a server and each of the first computing device and the second computing device), and 10B (including by establishing connections and communication channels between a server and each of the primary computing device and the plurality of secondary computing devices).

Once the needed communication channels are established, the collaborative session can proceed, with a teacher receiving via a teacher computing device data corresponding to information displayed on each of one or more student computing devices participating in the collaborative session, and a student receiving via a student computing device data corresponding to information displayed on a teacher computing device, and with other communication channels enabling exchange of additional video information (e.g. video of each teacher/student or presenter/participant), audio information, instant messages, or other media.

When used by a teacher and one or more students, embodiments of the present disclosure allow the teacher to perform an operation within a software or other computer application while the one or more students watch, and further allow the students to then perform the same operation while the teacher watches. The teacher can click and then watch as students duplicate those clicks. Students can be monitored to ensure that they are keeping up with the teacher and are seeing the same results as the teacher.

In embodiments of the present disclosure, a coordination application may be programmed to enable dual-presenter sharing (e.g. where two user's screens are shared with one or more additional users), rather than one-to-one or one-to-many sharing (e.g. where a teacher's screen is shared with one or more students and the one or more students' screens are shared with a teacher). Thus, two presenters may each share their computer screens with presentation participants. For example, embodiments of the present disclosure may be used to teach or demonstrate a back-and-forth transactional session. A first presenter using a first computing device may play the role of a user, and a second presenter using a second computing device may play the role of a support representative. Participants (e.g. new support representatives being trained), each with their own computing devices, can utilize a coordination application to simultaneously watch the screens of the first and second presenters.

As another example, a presenter may wish to present a slide deck containing instructions on how to complete tasks in a particular software application, and to simultaneously run the software application to demonstrate how to complete each task described in the slide deck. Using embodiments of the present disclosure, the presenter can share the slide deck from a first computing device and the software application from a second computing device, thus allowing participants to see both the slide deck and the software application during the presentation. Alternatively, a presenter may wish to compare two software applications side by side, which the presenter can do by sharing the first software application from a first computing device and the second software application from a second computing device. In some embodiments, a coordination application may even be programmed to share two screens from a single computing device, such that in the above examples, the presenter could share both the slide deck and the software application, or both the first and second software applications, as separate screens from a single computing device.

The visual display of a coordination application (e.g. visual display 516 of a coordination application 116) may include, in addition to the buttons discussed above, a "follow the leader" button or toggle. This button may be used, for example, by a student in a collaborative session, who may press the button on his or her coordination application visual display to cause the display of the teacher screen (e.g. teacher screen 632) in the student's coordination application visual display to follow the teacher's cursor. To avoid rapid changes of the display when using this setting, the coordination application may be programmed to cause the display on the teacher screen to move smoothly and slowly only if the teacher's cursor exits the displayed field of view and/or only after the teacher's cursor has been in a different area for a statistically relevant amount of time. The "follow rate" (e.g. the rate at which the display on the teacher screen moves to follow the teacher's cursor) could be adjustable by a particular user, or it may be pre-set.

As one additional example of how embodiments of the present disclosure may be used, two people might use one-to-one sharing as described herein to collaborate on a report. One person might take notes while the other pulls up reference materials. Because each can see his or her own screen and the other person's screen, the collaboration process can proceed more quickly that it would otherwise, yet the collaborators may still be physically remote from each other.

As can be seen from the above description, the system and methods disclosed herein are useful for establishing collaborative sessions between a teacher on the one hand and one or more students on the other, where the teacher can provide instruction while monitoring the activity of the students, and where the students can both see and apply the teacher's instruction at the same time. Specific details were given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. Moreover, where methods are described, the depicted steps or a subset thereof may be performed in various orders or in parallel without departing from the scope of the present disclosure. Additionally, various combinations of the features and functions described herein, even if such combinations are not explicitly described, may be utilized without departing from the scope of the present disclosure.

What is claimed is:

1. A method for providing a collaborative online session, comprising:
sending from a processor of a first computing device, via a network interface, a first data set corresponding to a first plurality of graphical elements displayed by the first computing device on a first graphical user interface;
receiving at the processor, via the network interface, a second data set corresponding to a second plurality of graphical elements displayed by a second computing device on a second graphical user interface;
storing the second data set in a computer readable storage medium of the first computing device; and
simultaneously displaying, on separate portions of the first graphical user interface, the first plurality of graphical elements and the second plurality of graphical elements.

2. The method of claim 1, further comprising:
receiving, at the processor, a command to share audio signals; and
in response to receiving the command to share audio signals, transmitting signals received from a microphone of the first computing device to the second computing device via the network interface.

3. The method of claim 1, further comprising:
receiving, at the processor, a command to share video signals; and
in response to receiving the command to share video signals, transmitting signals received from a video camera of the first computing device to the second computing device via the network interface of the first computing device.

4. The method of claim 1, further comprising:
comparing, with the processor, an attribute of an element of the first plurality of graphical elements with an attribute of an element of the second plurality of graphical elements;
selectively modifying, with the processor, the second plurality of graphical elements based on the comparison of the attribute of the element of the first plurality of graphical elements with the attribute of the element of the second plurality of graphical elements; and
storing the selectively modified second plurality of graphical elements in the computer readable storage medium of the first computing device.

5. The method of claim 4, wherein selectively modifying the second plurality of graphical elements comprises adding an additional graphical element to the second plurality of graphical elements.

6. The method of claim 4, wherein the element of the first plurality of graphical elements corresponds to a cursor displayed by the first computing device and the element of the second plurality of graphical elements corresponds to a cursor displayed by the second computing device.

7. The method of claim 4, wherein the comparison of the attribute of the element of the first plurality of graphical elements with the attribute of the element of the second plurality of graphical elements comprises comparing a location of the element of the first plurality of graphical elements with a location of the element of the second plurality of graphical elements.

8. The method of claim 7, wherein the location of the element of the first plurality of graphical elements is determined relative to another element of the first plurality of graphical elements.

9. The method of claim 7, wherein the location of the element of the first plurality of graphical elements is determined relative to a graphical element that is not part of the first plurality of graphical elements and that is not part of the second plurality of graphical elements.

10. The method of claim 4, wherein the comparison of the attribute of the element of the first plurality of graphical elements with the attribute of the element of the second plurality of graphical elements comprises determining whether each window or dialogue box of the first plurality of graphical elements has a corresponding window or dialogue box in the second plurality of graphical elements.

11. The method of claim 1, further comprising:
receiving, via the network interface, a third data set corresponding to a third plurality of graphical elements displayed by a third computing device via a third graphical user interface, the third data set sufficient to enable the first computing device to display the third plurality of graphical elements via the first graphical user interface; and
simultaneously displaying, on separate portions of the graphical user interface, the first plurality of graphical elements, the second plurality of graphical elements, and the third plurality of graphical elements.

12. A method for providing a server-facilitated collaborative online session, comprising:
simultaneously receiving at a processor, via a network interface, information corresponding to a primary set of graphical elements from a first computing device and information corresponding to a secondary set of graphical elements from a second computing device, the information corresponding to the primary set of graphical elements sufficient to enable the second computing device to display the primary set of graphical elements, and the information corresponding to the secondary set of graphical elements sufficient to enable the first computing device to display the secondary set of graphical elements;
comparing, with the processor, an attribute of one element of the primary set of graphical elements with an attribute of one element of the secondary set of graphical elements;
selectively modifying, with the processor, the information corresponding to the secondary set of graphical elements based on the comparison;
storing the selectively modified information corresponding to the secondary set of graphical elements in a computer readable storage medium coupled to the processor; and
simultaneously sending, from the processor and via the network interface, the information corresponding to the primary set of graphical elements to the second computing device and the selectively modified information corresponding to the secondary set of graphical elements to the first computing device.

13. The method of claim 12, further comprising:
receiving at the processor, via the network interface, mouse click information from the first computing device;
generating, with the processor, an indication signal in response to receiving the mouse click information; and
sending, from the processor and via the network interface, the indication signal to the second computing device.

14. The method of claim 13, wherein the indication signal comprises information corresponding to an additional graphical element.

15. The method of claim 13, wherein the indication signal comprises information corresponding to an audible sound.

16. The method of claim 12, further comprising:
receiving at the processor, simultaneously with the information corresponding to the primary and secondary sets of graphical elements and via the network interface, information corresponding to a tertiary set of graphical elements from a third computing device, the information corresponding to the tertiary set of graphical elements sufficient to enable the first computing device to display the tertiary set of graphical elements;
comparing, with the processor, the attribute of one element of the primary set of graphical elements with an attribute of one element of the tertiary set of graphical elements;
selectively modifying, with the processor, the information corresponding to the tertiary set of graphical elements based on the comparison;
storing the selectively modified information corresponding to the tertiary set of graphical elements in the computer readable storage medium; and
sending from the processor, simultaneously with the selectively modified information corresponding to the secondary set of graphical elements and via the network interface, the information corresponding to the primary set of graphical elements to the third computing device and the selectively modified information corresponding to the tertiary set of graphical elements to the first computing device.

17. A server for enabling collaborative online sessions, comprising:
a processor;
a network interface coupled with the processor; and
a computer readable storage medium coupled with the processor, the computer readable storage medium comprising instructions that are executed by the processor and that, when executed by the processor, enable the processor to:
simultaneously receive, via the network interface, first information corresponding to a primary set of graphical elements from a first computing device and second information corresponding to a secondary set of graphical elements from a second computing device, the first information sufficient to enable the second computing device to display the primary set of graphical elements, and the second information sufficient to enable the first computing device to display the secondary set of graphical elements;
compare a first attribute of one element of the primary set of graphical elements with a second attribute of one element of the secondary set of graphical elements;
selectively modify the second information based on the comparison;
store the selectively modified second information in the computer readable storage medium; and simultaneously send, via the network interface, the first information to the second computing device and the selectively modified second information to the first computing device.

18. The server of claim 17, wherein the primary set of graphical elements correspond to a software application being executed on the first computing device and the secondary set of graphical elements correspond to a software application being executed on the second computing device.

19. The server of claim 17, wherein the one element of the primary set of graphical elements is a first cursor and the one element of the secondary set of graphical elements is a second cursor.

20. The server of claim 17, wherein the computer readable storage medium further comprises instructions that, when executed by the processor, enable the processor to:

receive, simultaneously with the first and second information and via the network interface, third information corresponding to a tertiary set of graphical elements from a third computing device, the third information sufficient to enable the first computing device to display the tertiary set of graphical elements;

compare, with the processor, the first attribute with a third attribute of one element of the tertiary set of graphical elements;

selectively modify, with the processor, the third information based on the comparison;

store the selectively modified third information in the computer readable storage medium; and send, simultaneously with the sending of the selectively modified second information to the first computing device and via the network interface, the first information to the third computing device and the selectively modified third information to the first computing device.

* * * * *